(12) United States Patent
Esposito

(10) Patent No.: US 10,839,602 B1
(45) Date of Patent: Nov. 17, 2020

(54) SYSTEMS AND METHODS FOR NAVIGATING WITHIN A VISUAL REPRESENTATION OF A THREE-DIMENSIONAL ENVIRONMENT

(71) Applicant: The Boeing Company, Chicago, IL (US)

(72) Inventor: Christopher D. Esposito, Issaquah, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/588,879

(22) Filed: Sep. 30, 2019

(51) Int. Cl.
    *G06T 19/00* (2011.01)
    *G06T 15/20* (2011.01)

(52) U.S. Cl.
    CPC ............ *G06T 19/003* (2013.01); *G06T 15/20* (2013.01)

(58) Field of Classification Search
    CPC .............................. G06T 19/003; G06T 15/20
    See application file for complete search history.

(56) References Cited

U.S. PATENT DOCUMENTS

| | | | |
|---|---|---|---|
| 2004/0027394 A1* | 2/2004 | Schonberg | G06F 3/04815 715/850 |
| 2009/0083672 A1* | 3/2009 | Fitzmaurice | G06F 16/954 715/851 |
| 2016/0216882 A1* | 7/2016 | Kiey | G16B 5/00 |

* cited by examiner

*Primary Examiner* — Phi Hoang
(74) *Attorney, Agent, or Firm* — McDonnell Boehnen Hulbert & Berghoff LLP

(57) ABSTRACT

In an example, a method for navigating within a visual representation of a three-dimensional (3D) environment is described. The method includes detecting a selection of a translational input trigger at a translational origin in a translational input region of a user interface. The method includes detecting that the translational input trigger has been moved from the translational origin to a point on a translational control border. The method includes detecting that the translational input trigger has been moved from within the position direct control zone to a location within the position rate control zone. The method includes, responsive to detecting that the translational input trigger has been moved from within the position direct control zone to the location within the position rate control zone, translating the field of view in the visual representation of the 3D environment at a velocity corresponding to the location within the position rate control zone.

20 Claims, 15 Drawing Sheets

508 —

522 — DETERMINING THAT (I) AN INPUT HAS BEEN RECEIVED AT THE CENTRAL PORTION OF THE POSITION CIRCLE AND (II) INPUT CONTACT HAS BEEN MAINTAINED BETWEEN THE CENTRAL PORTION OF THE POSITION CIRCLE AND THE CIRCUMFERENCE OF THE POSITION CIRCLE

FIGURE 8

524 — DETERMINING THAT THE TRANSLATIONAL INPUT TRIGGER IS WITHIN THE SNAP DISTANCE OF A FIRST AXIS OF THE TWO ORTHOGONALLY RELATED AXES

506 —

526 — TRANSLATING THE FIELD OF VIEW ALONG A LINE IN A FIRST DIRECTION OF THE VISUAL REPRESENTATION OF THE 3D ENVIRONMENT UNTIL REACHING A POINT WITHIN THE VISUAL REPRESENTATION OF THE 3D ENVIRONMENT CORRESPONDING TO THE TRANSLATIONAL CONTROL BORDER

528 — TRANSLATING THE FIELD OF VIEW BASED ON A DEGREE TO WHICH THE TRANSLATIONAL INPUT TRIGGER MOVES RELATIVE TO THE TWO ORTHOGONALLY RELATED AXES BETWEEN THE TRANSLATIONAL STARTING LOCATION AND THE POINT ON THE TRANSLATIONAL CONTROL BORDER

FIGURE 10

SYSTEMS AND METHODS FOR NAVIGATING WITHIN A VISUAL REPRESENTATION OF A THREE-DIMENSIONAL ENVIRONMENT

FIELD

The present disclosure relates generally to navigating within a visual representation of a three-dimensional (3D) environment. In particular, the present disclosure relates to using a user interface to navigate within the 3D environment.

BACKGROUND

A representation of a 3D environment can be used to virtually inspect aspects of the environment. For example, the representation might include an object (e.g., an aircraft) for virtual inspection. The virtual representation can be used for training purposes, for maintenance purposes, for inspection purposes, or the like.

In certain contexts, it is desirable to virtually inspect an object while being in a close proximity with the object. For example, a user may wish to interact with a schematic view of an aircraft while maintaining the aircraft. In these contexts, it may be difficult to interact with a computing device used to depict a representation of an environment containing the aircraft. For example, a tablet device having a touchscreen may require multiple points of contact with the touchscreen in order to manipulate the representation and to inspect the aircraft. Further, the user may have difficulty holding the tablet and adjusting these points of contact in a controlled manner.

What is needed is a user interface capable of receiving user input and navigating within a visual representation of a 3D environment in an intuitive and easily-controllable manner.

SUMMARY

In an example, method for navigating within a visual representation of a three-dimensional (3D) environment is described, the method includes detecting, by way of a user interface of a computing device, a selection of a translational input trigger at a translational origin of a translational input region of the user interface. The translational input region includes: a position direct control zone for translating a position of a field of view within a visual representation of a 3D environment, wherein the translational origin in the translational input region is within the position direct control zone, and a position rate control zone for controlling the velocity of translating the field of view within the visual representation of the 3D environment, wherein the position rate control zone is separated from the position direct control zone by a translational control border. The method includes detecting, by way of the user interface, that the translational input trigger has been moved from the translational origin in the translational input region to a point on the translational control border. The method includes translating the field of view to a point in the visual representation of the 3D environment corresponding to the point on the translational control border. The method includes detecting, by way of the user interface, that the translational input trigger has been moved from within the position direct control zone to a location within the position rate control zone. The method includes, responsive to detecting that the translational input trigger has been moved from within the position direct control zone to the location within the position rate control zone, starting at the point in the visual representation of the 3D environment corresponding to the point on the translational control border, translating the field of view in the visual representation of the 3D environment at a velocity corresponding to the location within the position rate control zone.

In another example, a computing device having a user interface, a processor, and memory storing instructions is described. The instructions executable by the processor to detect, by way of the user interface, a selection of a translational input trigger at a translational origin in a translational input region of the user interface. The translational input region includes: a position direct control zone for translating a position of a field of view within a visual representation of a 3D environment, wherein the translational origin in the translational input region is within the position direct control zone, and a position rate control zone for controlling a velocity of translating the field of view within the visual representation of the 3D environment, wherein the position rate control zone is separated from the position direct control zone by a translational control border. The instructions executable by the processor to detect, by way of the user interface, that the translational input trigger has been moved from the translational origin in the translational input region to a point on the translational control border. The instructions executable by the processor to translate the field of view to a point in the visual representation of the 3D environment corresponding to the point on the translational control border. The instructions executable by the processor to detect, by way of the user interface, that the translational input trigger has been moved from within the position direct control zone to a location within the position rate control zone. The instructions executable by the processor to, responsive to detecting that the translational input trigger has been moved from within the position direct control zone to the location within the position rate control zone, starting at the point in the visual representation of the 3D environment corresponding to the point on the translational control border, translate the field of view in the visual representation of the 3D environment at a velocity corresponding to the location within the position rate control zone.

In another example, a non-transitory computer readable medium is described. The non-transitory computer readable medium has stored thereon instructions, that when executed by one or more processors of a computing device, cause the computing device to perform functions. The functions include detecting, by way of a user interface of a computing device, a selection of a translational input trigger at a translational origin in a translational input region of the user interface. The translational input region includes a position direct control zone for translating a position of a field of view within a visual representation of a 3D environment, wherein the translational origin in the translational input region is within the position direct control zone, and a position rate control zone for controlling a velocity of translating the field of view within the visual representation of the 3D environment, wherein the position rate control zone is separated from the position direct control zone by a translational control border. The functions include detecting, by way of the user interface, that the translational input trigger has been moved from the translational origin in the translational input region to a point on the translational control border. The functions include translating the field of view to a point in the visual representation of the 3D environment corresponding to the point on the translational control border. The functions include detecting, by way of the user interface, that the translational input trigger has been moved from within the position direct control zone to a location within the position rate control zone. The functions include, responsive to detecting that the translational input trigger has been moved from within the position direct control zone to the location within the position rate control zone, starting at the point in the visual representation of the 3D environment corresponding to the point on the translational control border, translating the field of view in the visual representation of the 3D environment at a velocity corresponding to the location within the position rate control zone.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 8 illustrates a flowchart of a method for use with the method shown in FIGS. 5 and 7, according to an example implementation.

FIG. 9 illustrates a flowchart of a method for use with the method shown in FIGS. 5 and 7, according to an example implementation.

FIG. 10 illustrates a flowchart of a method for use with the method shown in FIGS. 5 and 9, according to an example implementation.

DETAILED DESCRIPTION

Figure 1:
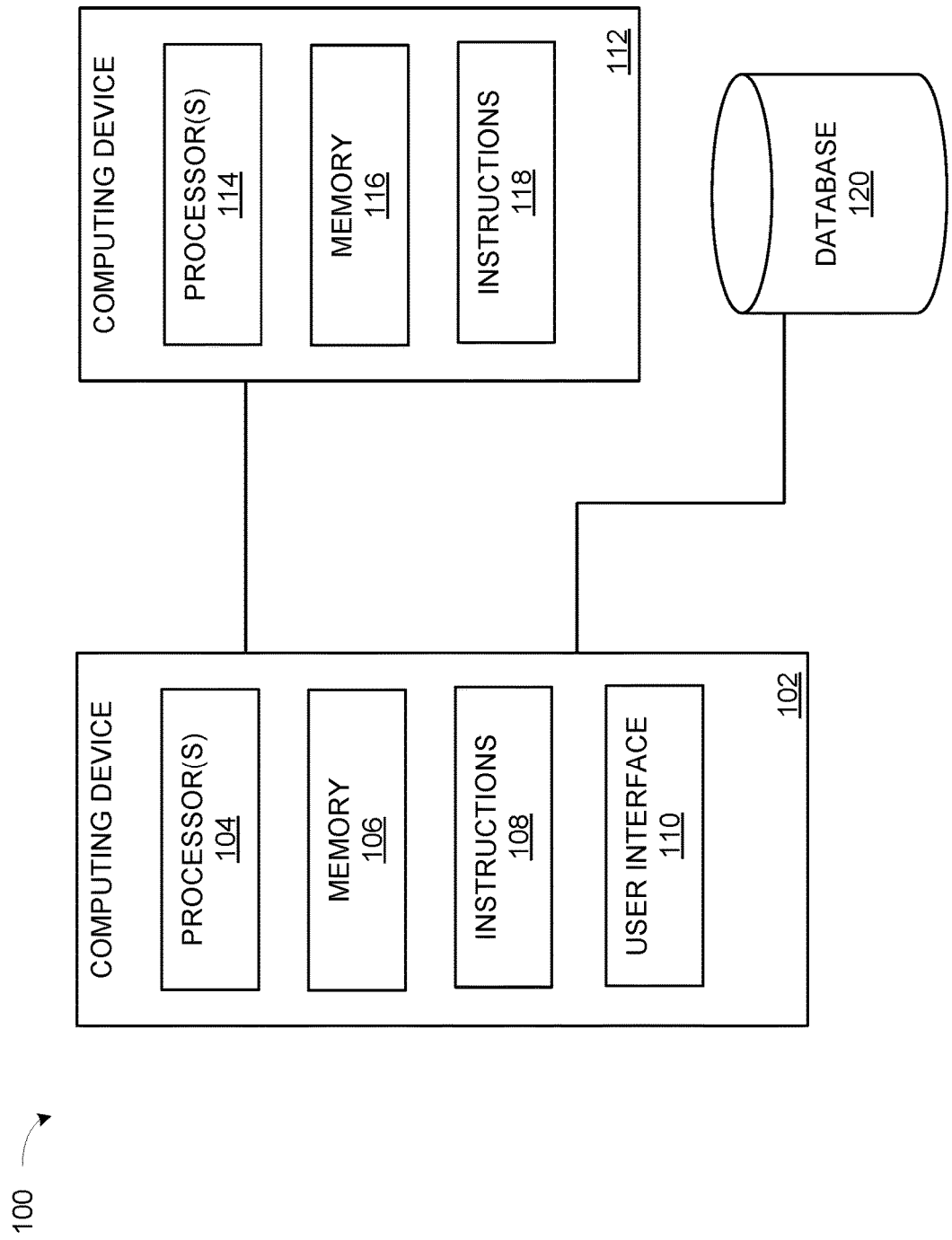
FIG. 1 illustrates a block diagram of a system for navigating within a visual representation of a three-dimensional environment, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for interacting with a representation of a three-dimensional (3D) environment are described. In particular, systems and methods for interacting with the representation of an environment using a user interface, such as a touchscreen, are described.

Example systems and methods involve use of an intuitive and user-interface that allows for both quick and precise interaction with aspects of a representation of a 3D environment. For example, a touchscreen is described that has particular input regions that can be operated in multiple modes. A translational input region has a position direct control zone that allows for precise control of a field of view in the representation of the 3D environment in a first mode and a position rate control mode that allows for quick translation of the field of view in a second mode. Similarly, a rotational input region has a rotation direct control zone that allows for precise control of an angle of the field of view in a first mode and a rotation rate control mode that allows for quick rotation of the field of view in a second mode. Further the control schemes may be changed in a seamless manner (i.e., without any explicit and separate change activity the user) by sliding an input trigger from one zone to the next. This manner of organizing a user interface may allow for user-friendly and intuitive control of the field of view, particularly where a touchscreen is used.

Within examples, a computing device associated with the user interface may interact with another computing device associated with an object for inspection (e.g., an aircraft). The other computing device may communicate relevant information for display on the user interface, such as relative locations of components that should be inspected or replaced. The user can navigate within the user interface and use it as a guide to each component of the object that is due for inspection or replacement. Thus, a technician can use the systems and methods described herein to easily interact with schematic information for an object, such as an aircraft.

By the term "coordinate system" used herein, it is meant that a system uses one or more numbers, or coordinates, to uniquely determine the position of a point or other geometric element in some spatial construct, such as Euclidean space. The number of dimensions in such a space can vary; for example, two or three-dimensional spaces. Examples of coordinate systems are a universal coordinate system in which all other systems are embedded, and a local coordinate system that is specific to a specific geometric element.

By the term "position" used herein, it is meant that set of values (often called an ordered tuple or coordinate pair or triple) is used for a specific point in a specified coordinate system. The order of these coordinate values relates to particular aspects of the coordinate system, such as various axes. These values are often referred to by names (e.g., the first can be called the 'x' coordinate; the second as the 'y' coordinate, the third as the 'z' coordinate). These names also refer to the names of the axes that help define the coordinate space. Example coordinate systems described herein are called Cartesian.

By the term "origin" used herein, it is meant that point in a coordinate system (e.g., a Cartesian coordinate system) exists where the axes all intersect and the value for each of the coordinates of this point are all zero.

By the term "orientation" used herein, it is meant that an attitude of an object such as a line, plane, or rigid body describes how it is placed in the space it occupies. Example terms for the components of an object's orientation are roll, pitch and yaw. Within examples, an orientation may be represented by set of angles (1 for each axis) by which a geometric element would have to be rotated so that the axes in the element's local coordinate system become parallel to the axes in a parent coordinate system, such as a universal coordinate system.

The term "location" used herein, refers to one or more of a position and orientation of an object.

By the term "coordinate transform" used herein, it is meant that a location of a geometric element, such as a point, exists in relation to a plurality of coordinate systems, and the process of converting the coordinates for a point in one system to those in a different system is known as a coordinate transformation. Within examples, a transformation that applies to the position of an object is called a translation, and one that applies to the orientation is called a rotation. These may be combined into a single composite transformation.

The term "location direct control" used herein, refers to a control scheme in which outputs shown in a representation of an environment are associated with how slowly or quickly a user moves an input trigger within a control zone. More particularly, this may relate to an input to output control scheme with a fixed linear zeroth order transfer function (e.g., a change of size I in an input always results in an output of size O; the ratio between I and O might be 1:1 or some other fixed ratio). Certain control zones of the user interfaces described herein have this kind of control scheme. A small change from the origin in position input within the control zone from one point in time to the next results in a small change in viewpoint position over that time period, or a low velocity, or alternatively a small change in rotation amount. A larger change over a fixed time period results in a larger change in position, and so a higher velocity. If there is no change in position input on the inner ring from one point in time to the next, then there is no change in viewpoint position during that same time period, so the velocity is zero.

The term "location rate control" used herein, refers to a control scheme in which outputs shown in a representation of an environment are associated with changes in user input and with a relative distance between an input trigger an origin of a control zone. In particular, this may relate to an input to output control scheme with a variable first order transfer function. Certain control zones may allow for a small change in within the control zone to result in a small change in viewpoint translation change rate or in rotation rate. If either of these changes results in a non-zero rate (e.g., velocity), then the associated underlying attribute (e.g., position or rotation) will also change. However, even if there is no change in input position, if the current position corresponds to a non-zero rate, then that velocity may remain constant and the underlying quantity (e.g., either position or rotation) will continue to change as time passes.

The term "control scheme" user herein refers to a manner of navigating within a representation of an environment. Within the examples provided herein, different control schemes have different qualities. The control schemes may change automatically (e.g., within additional user input) as a user interacts with a user interface.

Turning now to the figures, FIG. 1 illustrates a block diagram of a system 100 for navigating within a visual representation of a three-dimensional environment, according to an example implementation. In particular, FIG. 1 shows a computing device 102 that can interact with a computing device 112 and a database 120.

The computing device 102 includes one or more processor(s) 104, a memory 106, instructions 108, and a user interface 110. The one or more processor(s) 104 may be general-purpose processors or special purpose processors (e.g., digital signal processors, application specific integrated circuits, etc.). The one or more processor(s) 104 can be configured to execute the instructions 108 (e.g., computer-readable program instructions) that are stored in the memory 106 and are executable to provide the functionality of computing device 102, and related systems and methods described herein.

The memory 106 may include or take the form of one or more computer-readable storage media that can be read or accessed by the processor(s) 104. The computer-readable storage media can include volatile and/or non-volatile storage components, such as optical, magnetic, organic or other memory or disc storage, which can be integrated in whole or in part with the processor(s) 104. The memory 106 is considered non-transitory computer readable media. In some examples, the memory 106 can be implemented using a single physical device (e.g., one optical, magnetic, organic or other memory or disc storage unit), while in other examples, the memory 106 can be implemented using two or more physical devices. The memory 106 thus is a non-transitory computer readable storage medium, and instructions 108 executable by the processor(s) 104 are stored on the memory 106. The instructions 108 include computer executable code.

The user interface 110 may include or take the form of a keyboard, a mouse, a touchscreen, a microphone, a gesture recognition system, a combination thereof, or another means of receiving user input by the computing device 102. The user interface can be integrated into the computing device 102 as depicted in FIG. 1 or be included in another subsystem or device. Though the examples below are generally described as pertaining to use of a touchscreen, other interfaces are possible.

As described in greater detail below, the instructions 108 may be executed by the processor(s) 104 to represent a 3D environment and to receive inputs from the user interface 110. The instructions 108 are executable to navigate within the representation of environment responsive to receiving the inputs.

The computing device 112 includes processor(s) 114, a memory 116, and instructions 118. The processor(s) 114 may be configured similarly to the processor(s) 104, and the memory 116 may be configured similarly to the memory 106. The instructions 118 are stored on the memory 116 and are executable by the processor(s) 114 to perform functions. For example, the computing device 112 may be associated with an object being inspected using the computing device 102. In such examples, the instructions 118 may be executable to determine a position of the computing device 102 relative to the object or may provide the computing device 102 with details of the object, such as relative locations of particular aspects of the object. For example, if the object is an aircraft, the instructions 118 may be executable by the processor(s) 114 to provide locations of sensors, processors, actuators, electrical junctions, or the like. Such scenarios are described in further detail below.

The database 120 may include representations of various objects and/or environments, and may send such representations to the computing device 102 upon receiving a corresponding request. In this manner, the computing device 102 may receive an input via the user interface 110 that specifies a type of operation (e.g., a maintenance operation for an aircraft), and the database 120 may provide information that pertains to the type of operation.

Though the computing device 102 is depicted as interacting with the computing device 112 and the database 120, it should be understood that various operations described below may be performed solely by the computing device 102. Further, the computing device 102 may interact with various other devices, such as a maintenance controller for a plurality of devices (e.g., a fleet of aircraft). The computing device 112, database 120, the maintenance controller, or another device can provide information for display on the user interface 110, including but not limited to schematic details of the object, maintenance tasks or instructions, 3D rendering information, or the like.

Figure 2:
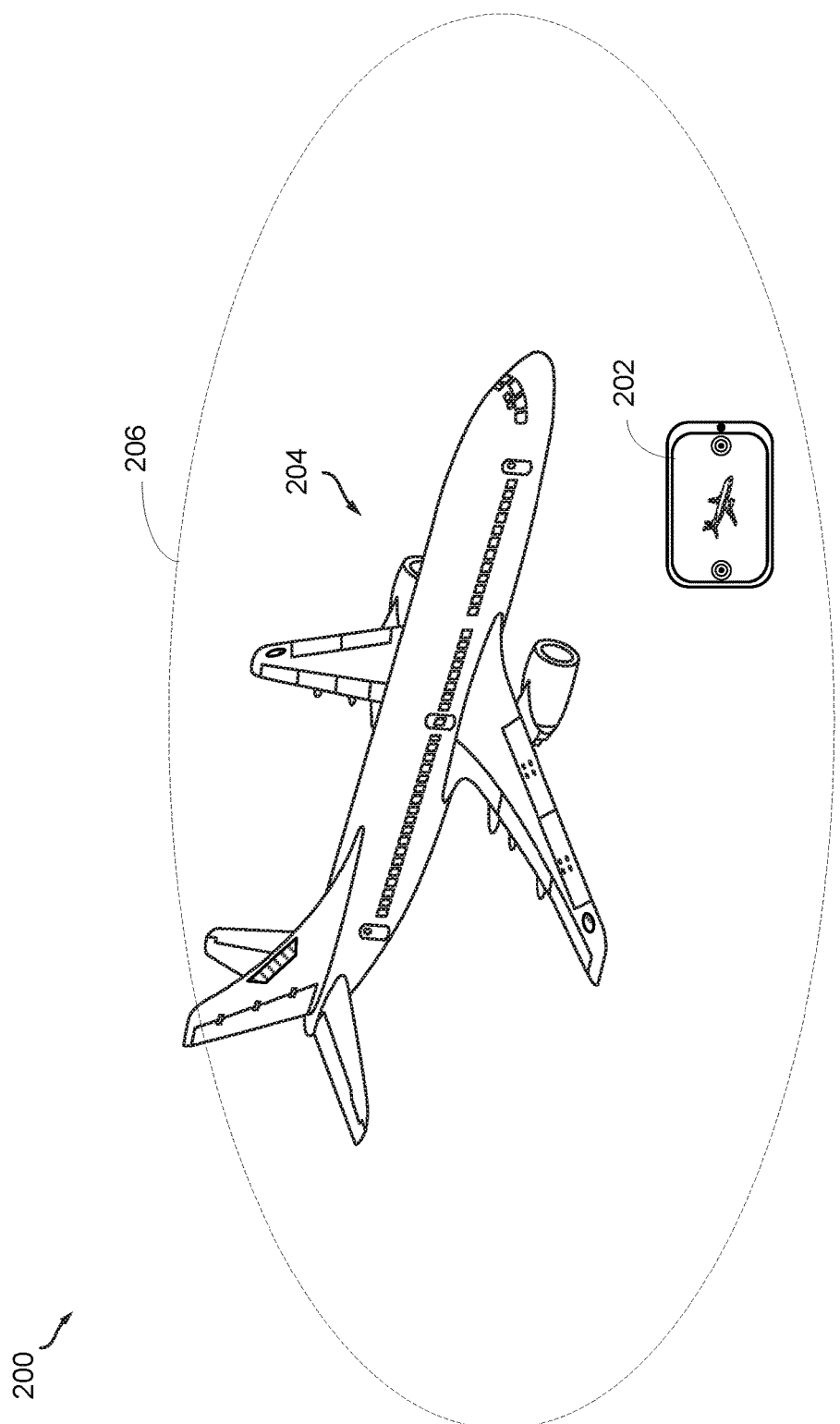
FIG. 2 illustrates an example environment for inspection using a computing device, according to an example implementation.

FIG. 2 illustrates an environment 200 for inspection using a computing device 202, according to an example implementation. In the present example, the environment 200 includes an aircraft 204 for inspection. The computing device 202 can be brought to the environment 200 to assist with inspecting or maintaining the aircraft 204. The computing device 202 may be the same or similar to the computing device 102 and the aircraft 204 may include or be associated with a computing device that is the same or similar to the computing device 112. The computing device of the aircraft may provide information, such as a list of components that need inspection or replacement and representations of relative locations of those components on the aircraft 204. In this manner, the computing device 202 can be used to assist a user in navigating to various points in the environment to interact with the aircraft 204. Further, the computing device 202 can be used to track which components of the aircraft 204 have been inspected, maintained, replaced, or the like. Other scenarios for using the computing device 202 to assist in navigating within an environment are possible. For example, the computing device 202 can be used for navigating within a virtual environment (e.g., for training purposes).

Within examples, the computing device 202 can scan the environment 200 to determine when it has reached a predetermined proximity to the object it is inspecting. For example, the computing device 202 may communicate with the computing device of the aircraft 204 to determine that the computing device 202 is within a threshold distance 206 of the aircraft 204. In this manner, the computing device 202 may determine which representation to provide via its user interface. Different representations may be stored (e.g., in the memory 106 or the database 120) that correspond to different objects. The computing device 202 may identify the object (e.g., using an image capture device on the computing device 202 or by receiving user input indicative of a type of object for inspecting), and responsively receive information for displaying a representation of the object on the user interface.

Figure 3A:
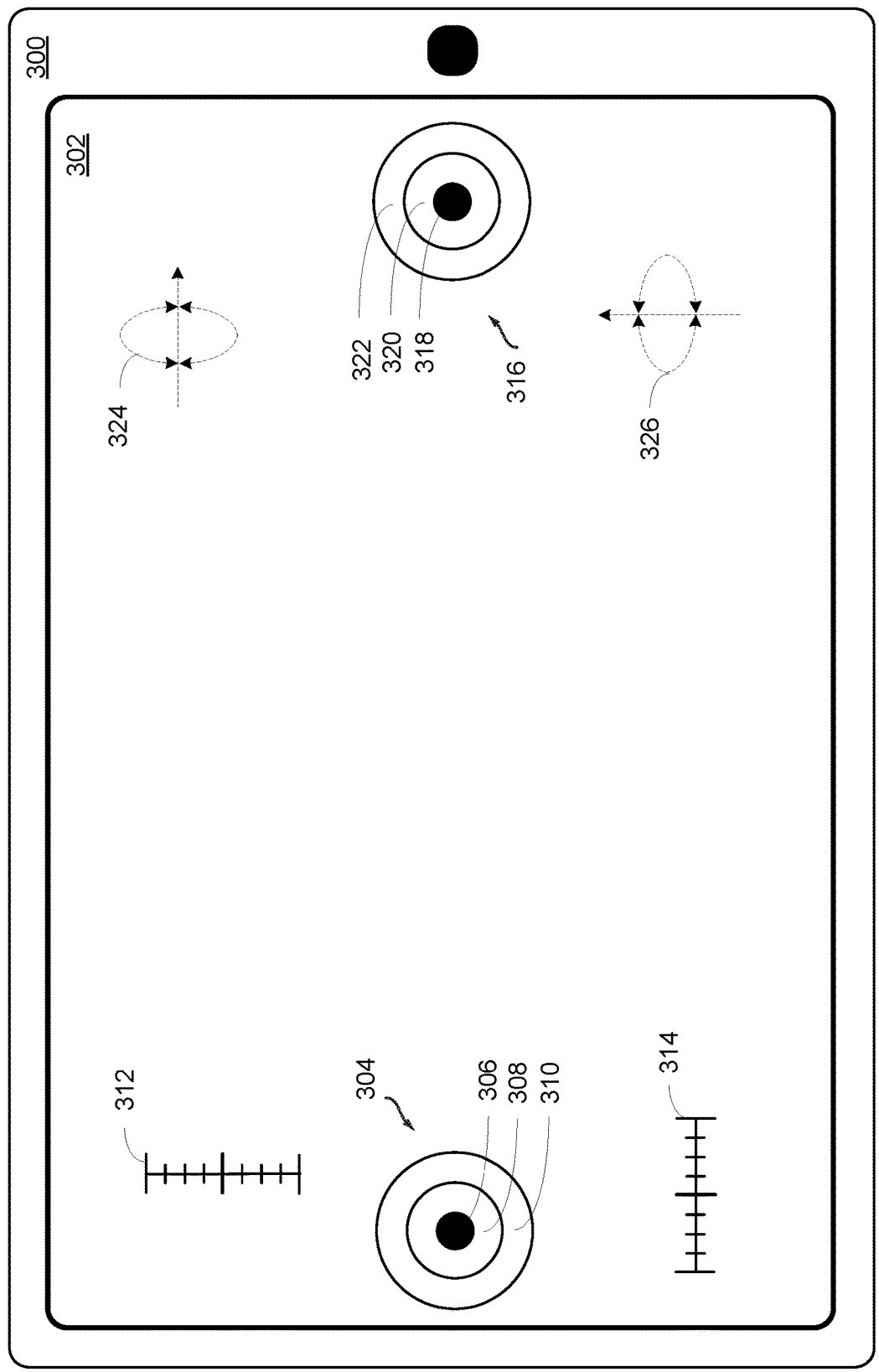
FIG. 3A illustrates a device for inspecting a representation of a three-dimensional environment, according to an example implementation.

FIG. 3A illustrates a device 300 for inspecting a representation of a 3D environment, according to an example implementation. For purposes of simplicity, no example representation of the 3D environment is provided in FIG. 3A. The device 300 may be the same or similar to the computing device 102 described above. The device 300 includes a user interface 302 used for navigating within a representation of the 3D environment, and provides two input regions for receiving input. Each of the regions has two input zones capable of operating in three modes, which allow for ease of use and quick navigation within the representation of the 3D environment.

A translational input region 304 is provided that includes a translational input trigger 306, a position direct control zone 308, and a position rate control zone 310. The translational input trigger 306 can be moved within the translational input region 304 to navigate a position of a field of view within the representation of the 3D environment. The field of view corresponds to a field of view depicted on the user interface 302. In particular, the translational input trigger 306 can change the position of the field of view in two directions. The first direction, for example can be normal to the user interface 302, and thus navigate the field of view towards or away from an object in the representation of the 3D environment. A velocity of translating the field of view within the environment along the first dimension is represented by an axial velocity meter 312. The second direction, for example, can be parallel to an edge of the user interface 302, and the can navigate left or right or up and down relative to the object. In the following description, the second direction is used to navigate left and right within the representation of the 3D environment. A velocity of translating the field of view within the environment along the second dimension is represented by a lateral velocity meter 314. Using the translational input region 304 to navigate in only two dimensions of a 3D representation of an environment allows for a user-friendly and intuitive interface that only needs one point of contact for interacting with the representation.

A rotational input region 316 is provided that includes a rotational input trigger 318, a rotation direct control zone 320, and a rotation rate control zone 322. The rotational input trigger 318 can be moved within the rotational input region 316 to navigate a position of a field of view within the representation of the 3D environment. In particular, the rotational input trigger 318 can change the angle of the field of view along two axes. The first axis of rotation, for example, can be normal to the user interface 302, and thus form a pitch axis that rotates the field of view clockwise or counterclockwise. A velocity of rotating the field of view (i.e., an angular velocity) within the environment along the first axis represented by a pitch rotation rate meter 324. The second axis of rotation, for example, can be parallel to an edge of the user interface 302, and the can rotate right or left relative to the object to form a yaw axis left or right or up and down relative to the object to form a roll axis relative to the object. In the following description, the second axis is used to rotate left and right within the representation of the 3D environment. A velocity of rotating the field of view within the environment along the second axis is represented by a yaw rotation rate meter 326. Using the rotational input region 316 to navigate in only two dimensions of a 3D representation of an environment allows for a user-friendly and intuitive interface that only needs one point of contact for rotating the representation.

To further enhance ease of use, the translational input region 304 and the rotational input region 316 may be positioned close to outer edges of the user interface 302. For example, the translational input region 304 may be disposed so that a user's thumbs have available range of motion in directions that are parallel to both side and top edges of the tablet. Because this may vary based on hand dimensions of different users and, placement of the translational input region 304 and the rotational input region 316 can be fine-tuned from their default positions via an option in a settings portion of an application. The default for the horizontal offsets of the center of the translational input region 304 and the rotational input region 316 is about 220 pixels from the left and right edges, respectively, of the display, and can be changed to accommodate different users and limit scenarios where range of motion is limited. The translational input region 304 and the rotational input region 316 may translational input region 304 and the rotational input region 316 substantially centered along the top to bottom axis such that the device 300 (e.g., a tablet) is more balanced and easier to manage for extended periods than would be possible if the areas were at the top or bottom of the user interface 302. Accordingly, the default for the vertical offsets of the center of 306 and 318 is one half of the height of the screen in pixels, but can be changed to accommodate different users or different use contexts. This allows a user to easily reach the translational input trigger 306 and the rotational input trigger 318. Similarly, the translational input region 304 and the rotational input region 316 may each take up a relatively small portion of the user interface. For example, they may occupy a radius of 1 inch or less, allowing for relatively small movements of the translational input trigger 306 and the rotational input trigger 318 to change modes of controlling navigation of the field of view within the representation of the 3D environment.

Using the translational input region 304 in conjunction with the rotational input region 316 allows for a user to navigate within the representation of the 3D environment in any direction within the representation of the 3D environment. As described in greater detail below, these input regions can operate in a plurality of modes depending on how the user interacts with the respective trigger inputs, allowing for a robust means of navigating within the representation of the 3D environment.

Figure 3B:
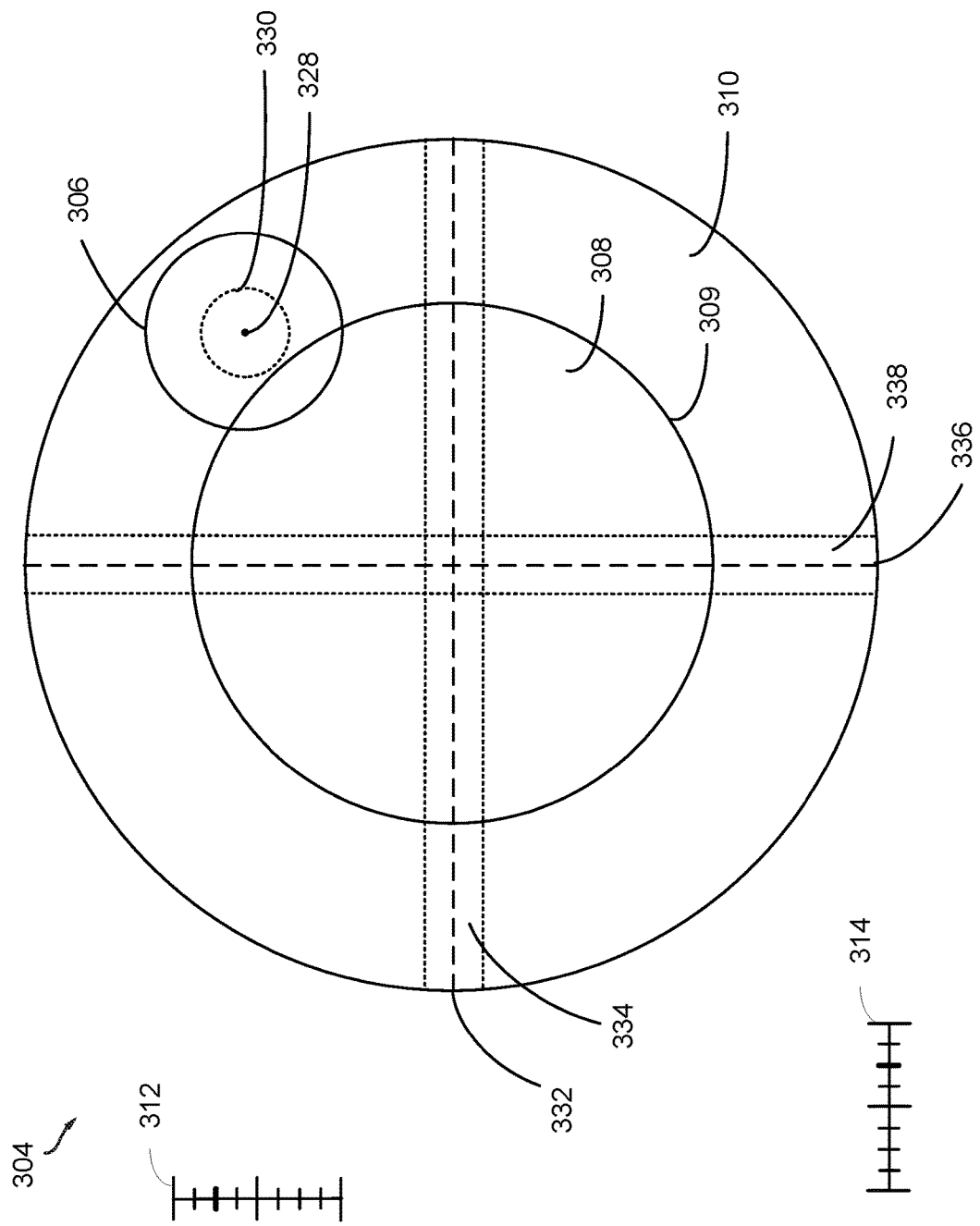
FIG. 3B illustrates a translational input region of a user interface, according to an example implementation.

FIG. 3B illustrates the translational input region 304 of a user interface, according to an example implementation. In particular, FIG. 3B shows the translational input trigger 306 at a position in the position rate control zone 310. The translational input trigger 306 represents a region of the user interface 302 (e.g., a touchscreen) within which inputs are received. The translational input trigger 306 is defined by an outer edge and a center point 328. Any input received within the outer edge may be interpreted as a selection of the translational input trigger.

Dragging the trigger within the translational input region 304 can change the control scheme in effect when navigating within the representation of the 3D environment. In this context, control schemes include direct control and rate control. Within certain scenarios, these scheme changes only happen when dragging the translational input trigger 306 to cross a translational control border. For example, the translational input trigger 306 starts at a translational origin, which can be a center point of the translational input region 304. The translational input region 304 can allow for a field of view to move in one or more dimensions. In particular, the translational input region 304 allows for axial movement (i.e., forward and backward relative to a position of the field of view) and lateral movement (e.g., left and right relative to a position of the field of view). In the present example, an axial velocity meter 312 is depicted that shows a relative velocity of the field of view along the axial direction, and a lateral velocity meter 314 is depicted that shows a relative velocity of the field of view along the lateral direction. These relative velocities are determined by how the translational input trigger 306 is moved within the translational input region 304, as described further below. Though an axial direction and a lateral direction are depicted, the in FIG. 3B, other combinations of directions can be used. For example, the translational input trigger 306 can be moved within translational input region 304 to move the field of view along a vertical direction (i.e., up and down relative to the field of view). Further, it should be understood that the axial velocity meter 312 and the lateral velocity meter 314 are depicted for exemplary purposes and might not be depicted on the user interface 302.

Moving the translational input trigger 306 within the position direct control zone 308 of the translational input region 304 causes the field of view of the representation of the 3D environment to translate within a defined area (e.g., a circle taking up a portion of the field of view). For example, this may be performed by an amount computed based on user input in the position direct control zone 308, for example, this may correspond to position direct control. The position direct control zone may be used to make relatively small adjustments to the representation of the 3D environment.

Moving the translational input trigger 306 from the position direct control zone 308 to the position rate control zone 310 results in changing the control scheme of navigating within the representation of the 3D environment. In particular, crossing a translational control border between the position direct control zone 308 and the position rate control zone 310 can cause the position control scheme to change from one where velocity is a side effect of input position change speed to one where rate is calculated by the application. The application-calculated velocity corresponds to a position of the translational input trigger 306 within the position rate control zone 310. In this manner, a user can quickly navigate from one position in the representation of the 3D environment to another position. Further, holding the translational input trigger 306 at a fixed position within the position rate control zone 310 for a period of time also results in changing the control scheme in effect for navigating within the representation. In this context, a "fixed position" may include keeping the center point 328 within an area 330 surrounding the center point 328 for a predetermined period of time (e.g., 3 seconds). In particular, this can cause the translational rate to accelerate, perhaps at a predetermined rate of change (e.g., by 5 percent at every input event). The velocity may increase until a predetermined translational rate threshold is reached (e.g., 50 meters/s) or it may increase without limit.

The translation input region 304 may further include one or snap regions that allow a user to maintain precise movement in a particular direction along a line. In FIG. 3B, a lateral snap region 334 surrounds a lateral line 332. The lateral line 332 corresponds to lateral movement of the field of view. Positioning the center point 328 of the translational input trigger 306 within the lateral snap region 334 causes the field of view to navigate only along the lateral direction and not along the axial direction. Further, in FIG. 3B an axial snap region 338 surrounds an axial line 336. The axial line 336 corresponds to axial movement of the field of view. Positioning the center point 328 of the translational input trigger 306 within the axial snap region 338 causes the field of view to navigate only along the axial direction and not along the lateral direction. Within examples, if the translational input trigger 306 is near enough to the original position of the translational input trigger 306 (i.e., within both the lateral snap region 334 and the axial snap region 338), then whichever distance along each axis is furthest from the original position determines which snap line to use. For example the center point 328 of the translational input trigger 306 being 10 pixels from the original location along the axial axis versus 6 pixels from the original location along the lateral axis results in snapping to the axial line 336.

After dragging the translational input trigger 306 within the translational input region 304 and releasing the translational input trigger 306, the translational input trigger 306 may return to the starting location.

Thus, within examples, a translational input region 304 that corresponds to a relatively small portion of a user interface can be used to navigate in accordance with a plurality of modes of operation, and allow for intuitive movement within a representation of an environment.

Figure 3C:
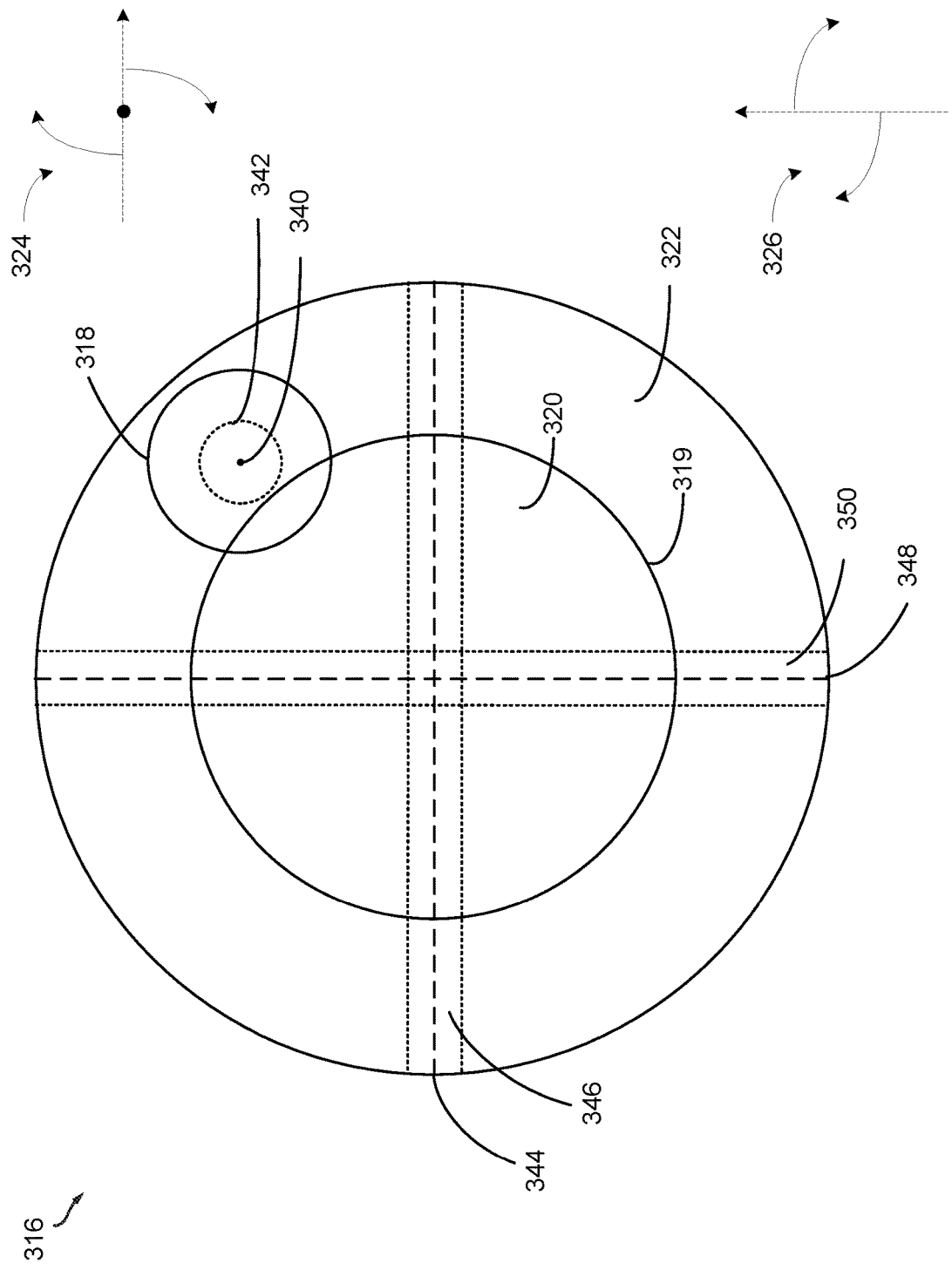
FIG. 3C illustrates a rotational input region of a user interface, according to an example implementation.

FIG. 3C illustrates a rotational input region 316 of a user interface 302, according to an example implementation. In particular, FIG. 3C shows the rotational input trigger 318 at a position in the rotation rate control zone 322. The rotational input trigger 318 represents a region of the user interface 302 (e.g., a touchscreen) within which inputs are received. The rotational input trigger 318 is defined by an outer edge and a center point 340. Any input received within the outer edge may be interpreted as a selection of the rotational input trigger 318.

Dragging the trigger within the rotational input region 316 can change the control scheme in effect when navigating within the representation of the 3D environment. For example, the rotational input trigger 318 starts at a rotational starting location, which can be a center point of the rotational input region 316. The rotational input region 316 can allow for a field of view to rotate along one or more axes. In particular, the rotational input region 316 allows for a pitch rotation along a pitch axis and a yaw rotation along a yaw axis. In the present example, a pitch rotation rate meter 324 is depicted that shows a relative rotation rate of the field of view along the pitch axis, and a yaw rotation rate meter 326 is depicted that shows a relative rotation rate of the field of view along the yaw axis. These relative velocities are determined by how the rotational input trigger 318 is moved within the rotational input region 316, as described further below. Though a pitch axis and a yaw axis are depicted, the in FIG. 3C, other combinations of axes can be used. For example, the rotational input trigger can be moved within rotational input region 316 to rotate the field of view along a roll axis. Further, it should be understood that the pitch rotation rate meter 324 and the yaw rotation rate meter 326 are provided for exemplary purposes and might not be shown on the user interface 302.

Moving the rotational input trigger 318 within the rotation direct control zone 320 of the rotational input region 316 causes the field of view of the representation of the 3D environment to rotate within a defined range of angles (e.g., plus or minus twenty degrees along either axis). For example, this may be performed by an amount computed based on user input in the rotation direct control zone 320. The rotation direct control zone 320 may be used to make relatively small adjustments to the representation of the 3D environment.

Moving the rotational input trigger 318 from the rotation direct control zone 320 to the rotation rate control zone 322 results in changing the control scheme of navigating within the representation of the 3D environment. In particular, crossing a rotational control border 319 between the rotation direct control zone 320 and the rotation rate control zone 322 can cause the rotation rate to change one where rotation rate is a side effect of input position change speed to one where rotation rate is calculated by the application. The application-calculated rotation rate corresponds to a position of the rotational input trigger 318 within the rotation rate control zone 322. In this manner, a user can quickly navigate from one orientation in the representation of the 3D environment to another orientation. Further, holding the rotational input trigger 318 at a fixed position within the rotation rate control zone 322 for a period of time also results in changing the control scheme in effect for navigating within the representation. In this context, a "fixed position" may include keeping the center point 340 within an area 342 surrounding the center point 340 for a predetermined period of time (e.g., 3 seconds). In particular, this can cause the rotation rate control to accelerate, perhaps at a predetermined rate of change (e.g., at 5 percent at every input event). The velocity may increase until a predetermined rotation rate threshold (e.g., 100 degrees/s) or it may increase without limit.

The rotational input region 316 may further include one or snap regions that allow a user to maintain precise rotation in along a particular axis. In FIG. 3C, a yaw snap region 346 surrounds a yaw line 344. The yaw line 344 corresponds to yaw rotation of the field of view. Positioning the center point 340 of the rotational input trigger 318 within the yaw snap region 346 causes the field of view to rotate only along the yaw axis and not along the pitch axis. Further, in FIG. 3C a pitch snap region 350 surrounds a pitch line 348. The pitch line 348 corresponds to pitch rotation of the field of view. Positioning the center point 340 of the rotational input trigger 318 within the pitch snap region 350 causes the field of view to navigate only along the pitch axis and not along the yaw axis. Within examples, if the rotational input trigger 318 is near enough to the original position of the rotational input trigger 318 (i.e., within both the yaw snap region 346 and the pitch snap region 350), then whichever distance along each axis is furthest from the original position determines which snap line to use. For example the center point 340 of the rotational input trigger 318 being 10 pixels from the original location along the yaw axis versus 6 pixels from the original location along the pitch axis results in snapping to the yaw line 344.

After dragging the rotational input trigger 318 within the rotational input region 316 and releasing the rotational input trigger 318, the rotational input trigger 318 may return to the starting location.

Figure 4A:
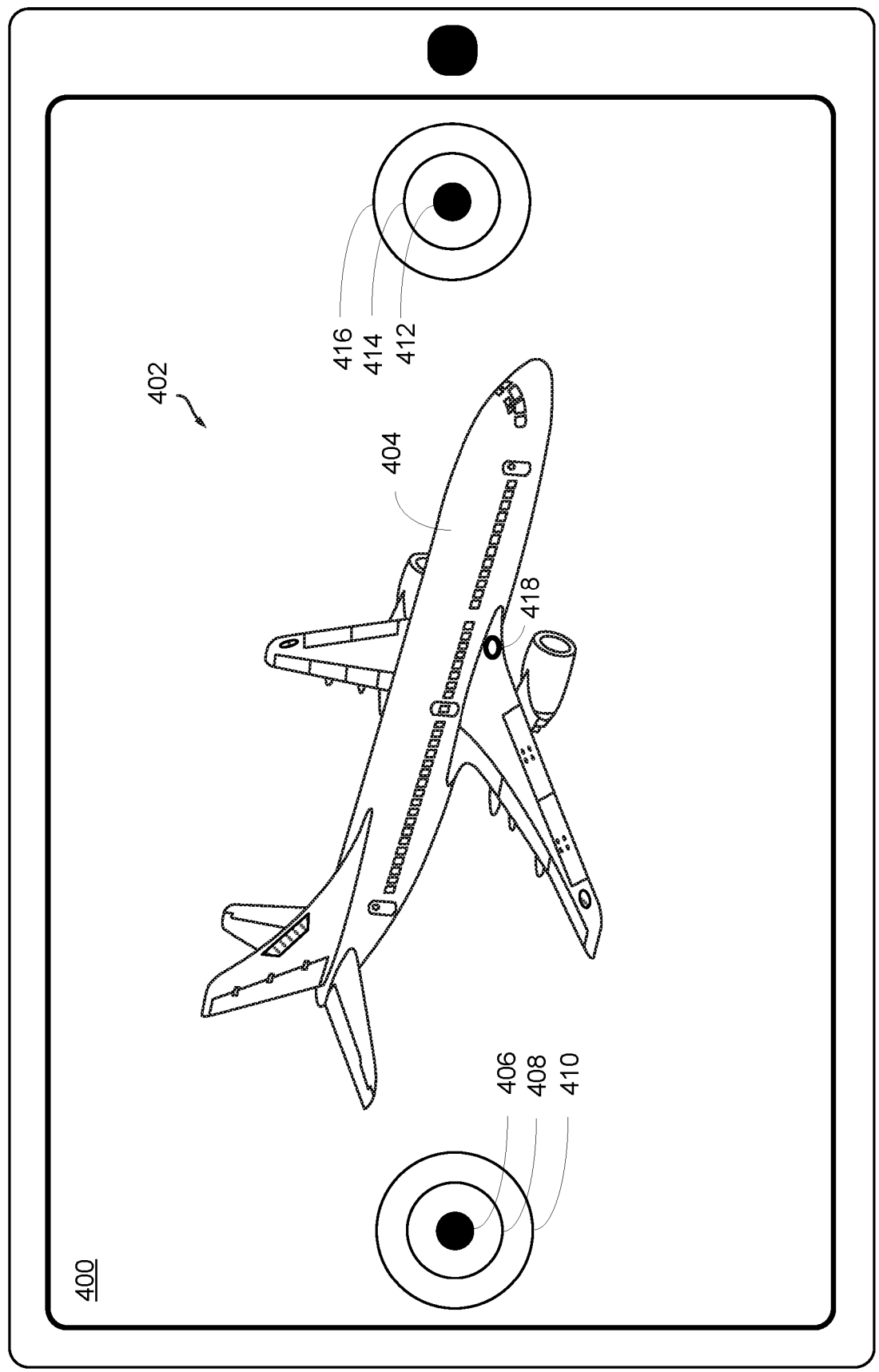
FIG. 4A illustrates a touchscreen at a first time, according to an example implementation.

FIG. 4A illustrates a touchscreen 400 at a first time, according to an example implementation. In particular FIG. 4A shows a representation of an environment 402 that includes an aircraft 404. The representation may be depicted for purposes of training or virtual inspection of the environment. For example, a technician may access the representation on a computing device (e.g, the computing device 102) for purposes of receiving guidance while maintaining an actual aircraft. Thus, in an example scenario corresponding to FIG. 4A, the technician selects the environment 402 for the computing device to represent (e.g., the technician may select from a list of aircraft types to provide a particular aircraft type). This may involve syncing with another computing device associated with the environment (e.g., a computing device of the aircraft 404), and receiving information regarding the representation. For example, a computing device associated with the aircraft (e.g., the computing device 112) may indicate that a particular part should be inspected or replaced, and this can be depicted in the representation of the 3D environment 402. Viewing the relative position of a particular part of the aircraft 404 within a virtual representation may allow the user to easily find that part on the aircraft 404. In the present scenario, the computing device of the aircraft 404 directs the user to inspect a portion of the wing that sustained an impact during a previous flight. An indicator 418 is provided in the representation of the 3D environment 402 to indicate the location of the portion of the aircraft 404 that should be inspected.

The user interacts with a translational input trigger 406 within a translational input region (i.e., within a position direct control zone 408 and a position rate control zone 410) to translate a field of view of the representation of the 3D environment 402. Though not depicted in relation to the example scenario, the user can also interact with a rotational input trigger 412 within a rotational input region (i.e., within a rotation direct control zone 414 and a rotation rate control zone 416) to rotate the field of view of the representation of the 3D environment 402.

Figure 4B:
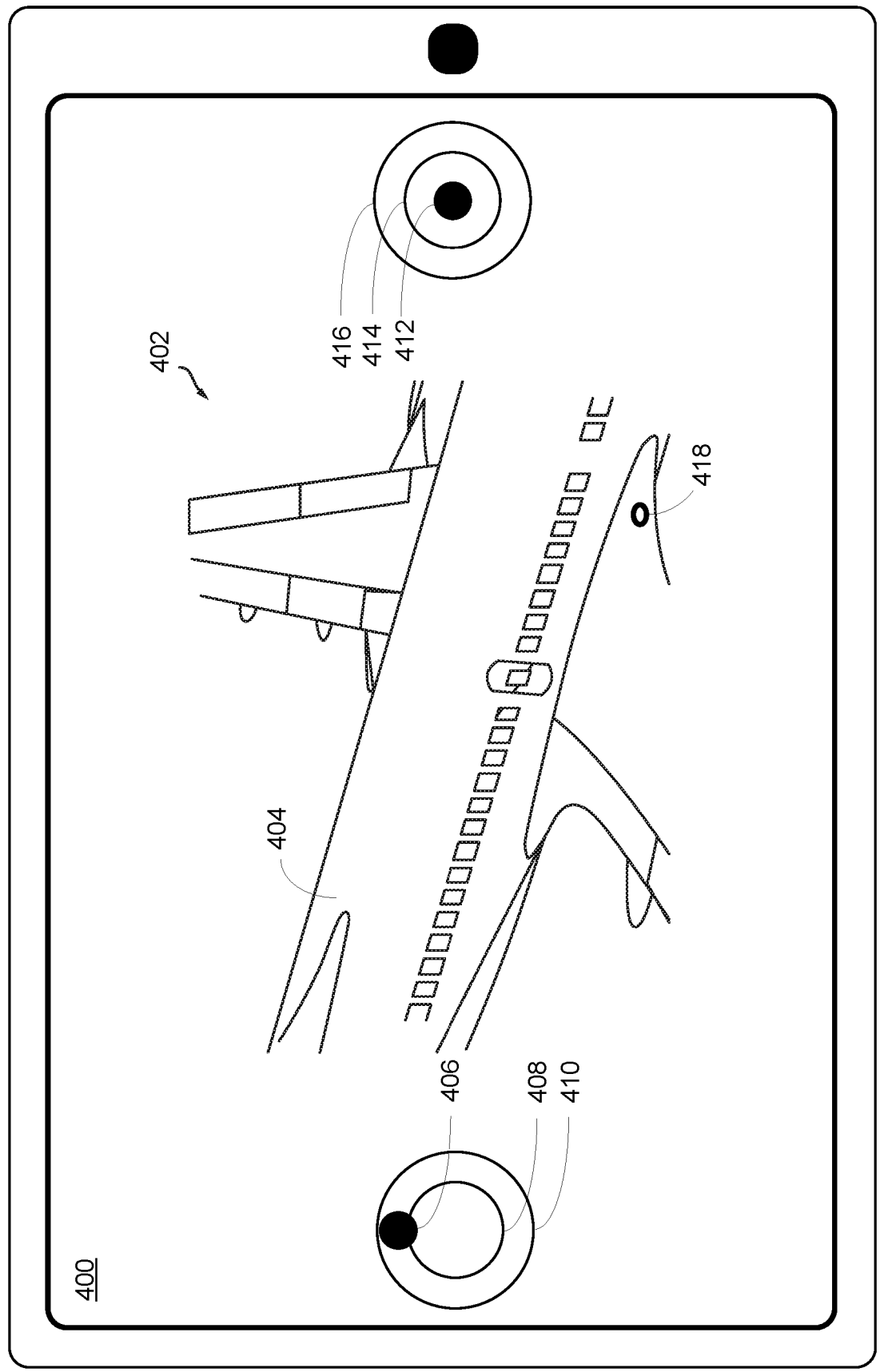
FIG. 4B illustrates a touchscreen at a second time, according to an example implementation.

FIG. 4B illustrates the touchscreen 400 at a second time, according to an example implementation. In particular, FIG. 4B shows the field of view being shifted forward in response to the translational input trigger 406 being dragged to the position rate control zone 410. Because this causes the field of view to move forward within the representation of the 3D environment 402, the representation of the aircraft 404 appears closer on the touchscreen 400. Within the example scenario, the indicator 418 appears towards a right portion of the touchscreen 400 as a result of the field of view moving forward.

Figure 4C:
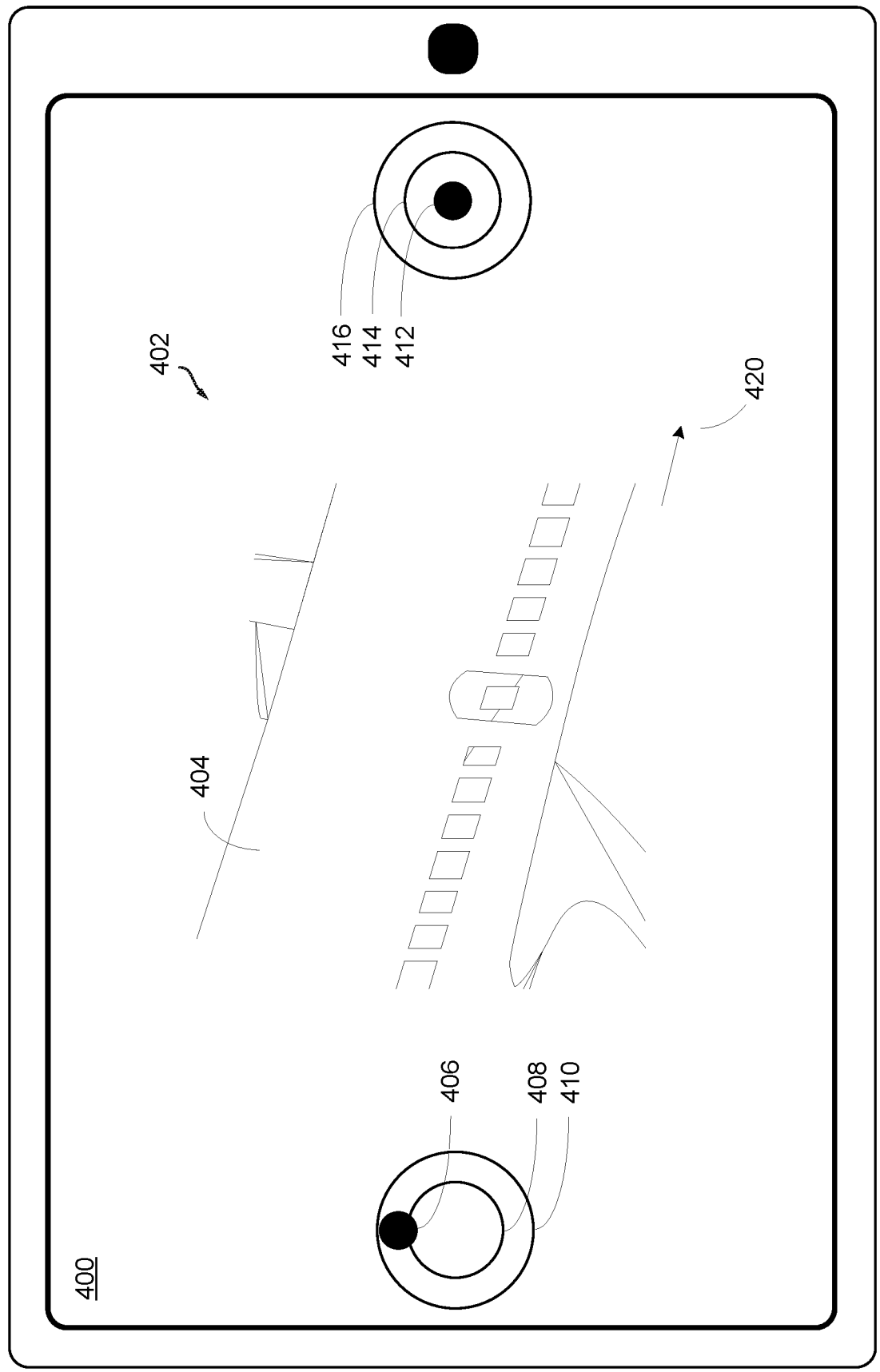
FIG. 4C illustrates a touchscreen at a third time, according to an example implementation.

FIG. 4C illustrates a touchscreen at a third time, according to an example implementation. In particular, FIG. 4C shows the field of view being shifted forward in response to the translational input trigger 406 remaining within the position rate control zone 410. Because this causes the field of view to move forward within the representation of the 3D environment 402, the representation of the aircraft 404 appears closer on the touchscreen 400. Within the example scenario, the indicator 418 no longer appears on the touchscreen 400 as a result of the field of view moving forward. In this example, a directional indicator 420 replaces the indicator 418 to show how the user can navigate the field of view to view the indicator 418.

Figure 4D:
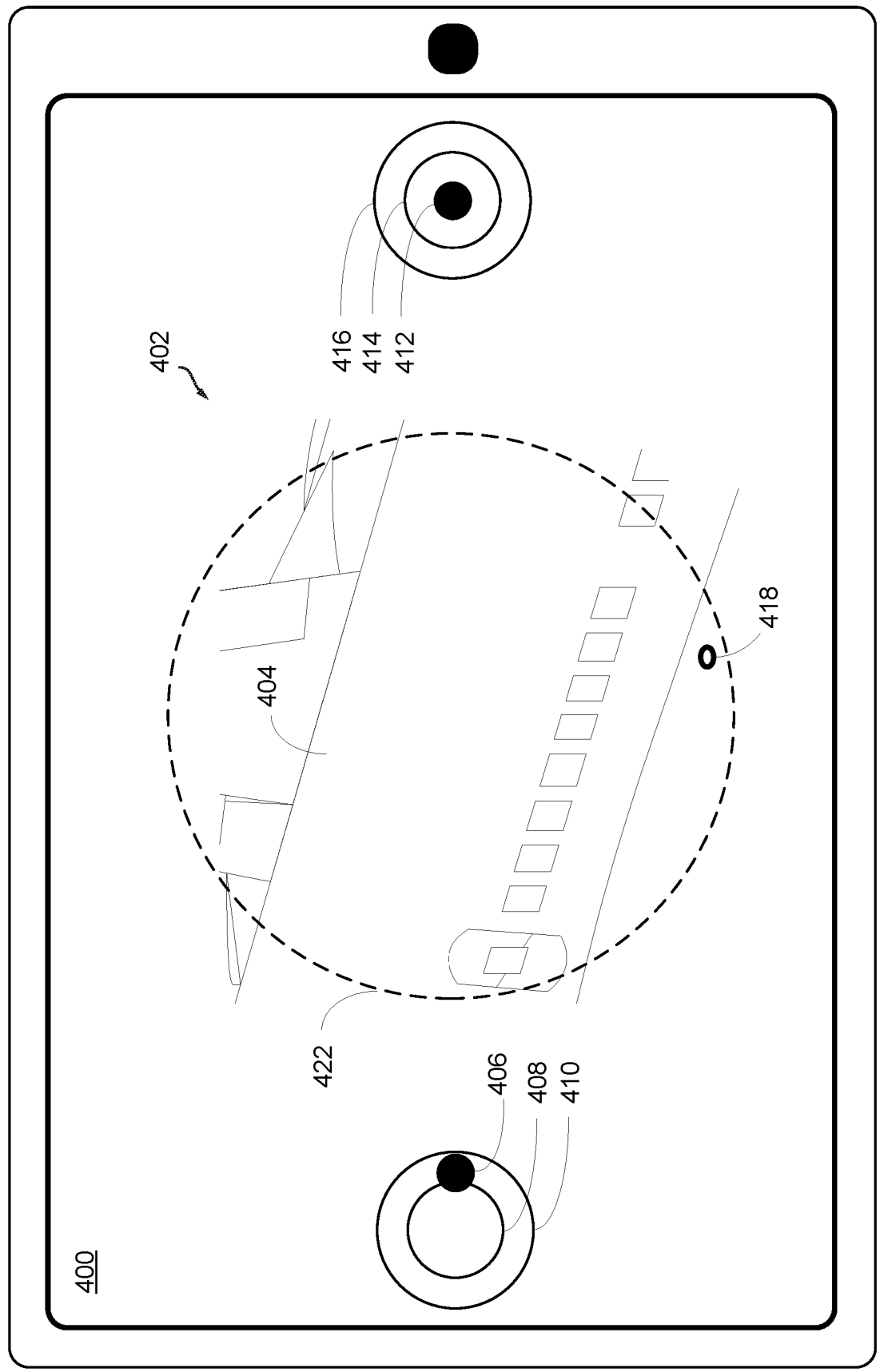
FIG. 4D illustrates a touchscreen at a fourth time, according to an example implementation.

FIG. 4D illustrates a touchscreen at a fourth time, according to an example implementation. FIG. 4C illustrates a touchscreen at a third time, according to an example implementation. In particular, FIG. 4C shows the field of view being shifted forward and to the right in response to the translational input trigger 406 being dragged to a different position within the position rate control zone 410. Because this causes the field of view to move forward within the representation of the 3D environment 402, the representation of the aircraft 404 appears closer on the touchscreen 400, and because this causes the field of view to move to the right within the representation of the 3D environment 402, the representation of the aircraft 404 appears to move to the right. Within the example scenario, the indicator 418 again appears on the touchscreen 400 as a result of the field of view moving forward. FIG. 4D also shows a circle 422 that indicates a range of positions in the current field of view that can be manipulated using the position direct control zone 408. Accordingly, once the field of view is close enough to virtually inspect the indicator 418, the user may use the position direct control zone 408 to make minor adjustments to the field of view.

Though FIGS. 4A, 4B, 4C, and 4D involve an example scenario where only the translational control region is used to navigate within a virtual representation of the 3D environment 402, the rotational control region may also be used. For example, if the indicator 418 corresponds to a part within the aircraft 404 or on another surface of the aircraft 404, the user may rotate the field of view in order to view the indicator 418. Further, the user may interact in other ways with the environment. For example, the user may select the indicator 418 to receive more detailed information, such as notes or instructions regarding the type of inspection to take place, potential tools or devices required for such an inspection, a parts list for purposes of a potential part replacement, or the like. Further, the user can use the touchscreen 400 to document some aspect of the inspection, such as select an indication that the inspection has been carried out, that maintenance has been performed, or the like. In this manner, a user can use the 3D representation to serve both as a guide for performing inspections or maintenance, and can also use the representation to document actions taken as a result of such an inspection or maintenance.

Figure 5:
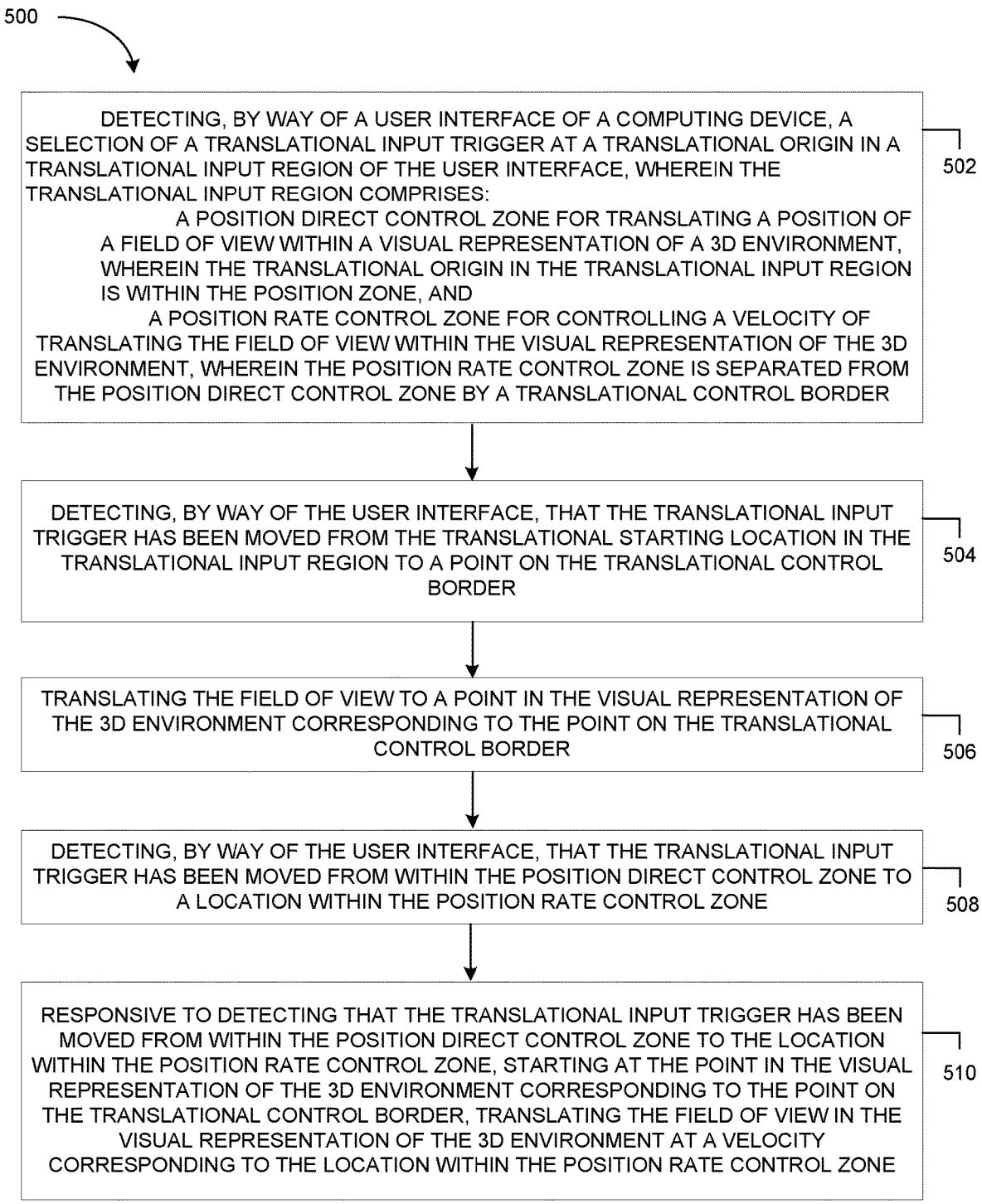
FIG. 5 illustrates a flowchart of a method for navigating within a visual representation of a three-dimensional environment, according to an example implementation.

FIG. 5 illustrates a flowchart of a method 500 for navigating within a visual representation of a three-dimensional (3D) environment, according to an example implementation. Method 500 shown in FIG. 5 presents an example of a method that could be used with the systems 100 shown in FIG. 1, the environment 200 shown in FIG. 2, the device 300 shown in FIGS. 3A, 3B, and 3C, the touchscreen 400 shown in FIGS. 4A, 4B, 4C, and 4D, a combination thereof or with components of thereof. Further, the functions described with respect to FIG. 5 may be supplemented by, replaced by, or combined with functions described above with respect to FIGS. 1, 2, 3A, 3B, 3C, 4A, 4B, 4C, and 4D. Further, devices or systems may be used or configured to perform logical functions presented in FIG. 5.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 500 may include one or more operations, functions, or actions as illustrated by one or more of blocks 502-510. Further, blocks 512-556 of the method 500 may be performed in accordance with one or more of block 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes, detecting, by way of a user interface 302 of a computing device 102, a selection of a translational input trigger 306 at a translational origin in a translational input region 304 of the touchscreen 400, wherein the translational input region 304 includes (i) a position direct control zone 308 for translating a position of a field of view within a visual representation of a 3D environment, wherein the translational origin in the translational input region is within the position direct control zone, and (ii) a position rate control zone 310 for controlling a velocity of translating the field of view within the visual representation of the 3D environment, wherein the position rate control zone 310 is separated from the position direct control zone 308 by a translational control border 309. For example, the position direct control zone 308 may be concentrically oriented with the position rate control zone 310 forming a ring around the position direct control zone 308. A border where the position direct control zone 308 meets the position rate control zone 310 can be the referred to as the translational control border 309. A center point 328 of the translational input trigger 306 crossing the translational control border 309 may cause a change in control scheme in effect for navigating the field of view within the representation of the 3D environment.

At block 504, the method 500 includes detecting, by way of the user interface 302, that the translational input trigger 306 has been moved from the translational origin in the translational input region to a point on the translational control border 309. For example, the trigger may be selected by a user and dragged from the translational origin to the point of the translational control border 309.

At block 506, the method 500 includes translating the field of view to a point in the visual representation of the 3D environment corresponding to the point on the translational control border 309. Between the translational origin (e.g., a center point of the position direct control zone 308) and the translational control border 309, navigating within the representation of the 3D environment may operate in a first control scheme in which the field of view navigates within a defined region (e.g., a circular area in the representation of the 3D environment) corresponding to edges of the position direct control zone 308. This navigation may occur at a constant velocity or at a velocity that corresponds to how quickly the input trigger is moved within the position direct control zone 308.

At block 508, the method 500 includes detecting, by way of the user interface 302, that the translational input trigger 306 has been moved from within the position direct control zone 308 to a location within the position rate control zone 310. This may involve determining that a center point 328 of the translational input trigger 306 has crossed the translational control border 309.

At block 510, the method 500 includes, responsive to detecting that the translational input trigger 306 has been moved from within the position direct control zone 308 to the location within the position rate control zone 310, starting at the point in the visual representation of the 3D environment corresponding to the point on the translational control border 309, translating the field of view in the visual representation of the 3D environment at a velocity corresponding to the location within the position rate control zone 310. This may involve changing a control scheme of navigating within the representation of the 3D environment from a first control scheme in which the velocity is proportional to a velocity of moving the translational input trigger 306 to a second control scheme in which the velocity is proportional to a distance of the translational input trigger 306 from the translational origin.

Figure 6:
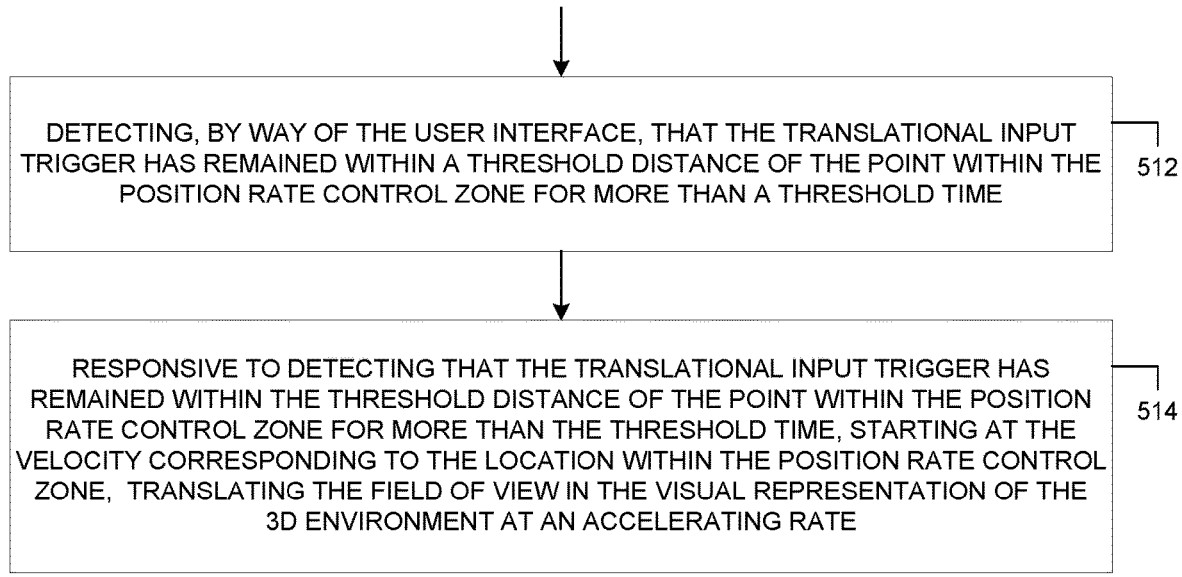
FIG. 6 illustrates a flowchart of a method for use with the method shown in FIG. 5, according to an example implementation.

FIG. 6 illustrates a flowchart of a method for use with the method 500 shown in FIG. 5, according to an example implementation. In particular, FIG. 6 shows an example in which the method 500 further includes blocks 512 and 514. At block 512, the method 500 includes detecting, by way of the user interface 302, that the translational input trigger 306 has remained within a threshold distance of the point within the position rate control zone 310 for more than a threshold time. For example, the center point 328 of the translational input trigger 306 may be dragged until reaching the point within the position rate control zone, and stop at the point. Functions may then include tracking the center point 328 to detect whether it remains within the threshold distance (e.g., a distance corresponding to a 10 pixel radius surrounding the point within the position rate control zone 310) for the threshold time (e.g., 0.2 seconds).

At block 514, the method 500 includes, responsive to detecting that the translational input trigger 306 has remained within the threshold distance of the point within the position rate control zone for more than the threshold time, starting at the velocity corresponding to the location within the position rate control zone, translating the field of view in the visual representation of the 3D environment at an accelerating rate. For example, this may involve changing a control scheme in effect for navigating within the representation of the 3D environment a second mode in which the velocity is proportional to a distance of the translational input trigger 306 from the translational origin, to a third control scheme in effect for navigating within the representation of the 3D environment in which the velocity accelerates (e.g., at a constant rate of change, such as 5 m/s$^2$). In this manner, a single input zone can serve as a way of navigating within the representation of the 3D environment in two separate control schemes.

Figure 7:
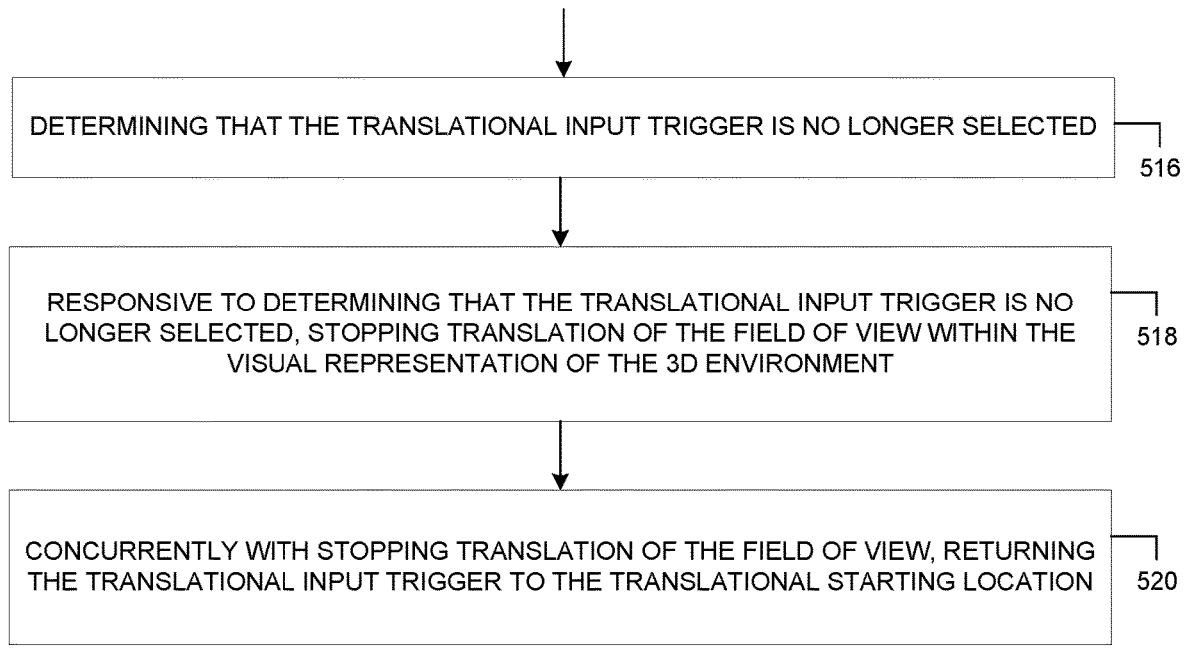
FIG. 7 illustrates a flowchart of a method for use with the method shown in FIG. 5, according to an example implementation.

FIG. 7 illustrates a flowchart of a method for use with the method 500 shown in FIG. 5, according to an example implementation. In particular, FIG. 7 shows an example in which the method 500 further includes blocks 516, 518, and 520. At block 516, the method 500 includes determining that the translational input trigger 306 is no longer selected. This may involve determining that a user is not touching the user interface 302 (e.g., using capacitive touch sensing of a touchscreen). At block, 518, the method 500 includes, responsive to determining that the translational input trigger is no longer selected, stopping translation of the field of view within the visual representation of the 3D environment. At block 520, the method 500 includes, concurrently with stopping translation of the field of view, returning the translational input trigger 306 to the translational origin.

FIG. 8 illustrates a flowchart of a method for use with the method 500 shown in FIGS. 5 and 7, according to an example implementation. In particular, FIG. 8 shows an example in which the method 500 further includes block 522. Further, FIG. 8 shows an example in which the user interface 302 comprises a touchscreen (e.g., the touchscreen 400), wherein the position direct control zone 308 comprises a position circle on the touchscreen, the position circle having a central portion and a circumference, wherein the circumference corresponds to the translational control border 309, wherein the translational origin is located in the central portion of the position circle. This may correspond to the illustration in FIG. 3A, which represents the position direct control zone 308 as a circle and shows the translational input trigger centered within the position direct control zone 308.

Block 522 is performed in accordance with block 508. At block 522, the method 500 includes determining that (i) an input has been received at the central portion of the position circle (e.g., at the center of the position direct control zone 308 as depicted in FIG. 3A) and (ii) input contact (e.g., capacitive touch sensed by the touchscreen) has been maintained between the central portion of the position circle and the circumference of the position circle. In this manner, the method 500 may detect the translational input trigger 306 being dragged within the user interface 302.

FIG. 9 illustrates a flowchart of a method for use with the method 500 shown in FIGS. 5 and 7, according to an example implementation. In particular, FIG. 9 shows an example in which the method 500 further includes blocks 524, and 526. Further, FIG. 9 shows an example in which the position circle includes two orthogonally related axes that cross at the translational origin. For example, these axes may correspond to the lateral line 332 and the axial line 336 depicted in FIG. 3B. The two orthogonally related axes correspond to two directions for translating the field of view within the visual representation of the 3D environment (e.g., a lateral direction and an axial direction, as described above with respect to FIG. 3B). Both of the two orthogonally related axes may correspond to a snap distance within which the translational input trigger causes translation of the field of view along a line in a corresponding direction of the visual representation of the 3D environment. For example, the snap distance may correspond to a threshold distance (e.g., 10 pixels) as shown by the lateral snap region 334 and the axial snap region 338 depicted in FIG. 3B.

At block 524 the method 500 includes determining that the translational input trigger 306 is within the snap distance (e.g., 10 pixels) of a first axis (e.g., an axis corresponding to the lateral line 332 or an axis corresponding to the axial line 336) of the two orthogonally related axes. Block 526 is performed in accordance with block 506. At block 526, the method 500 includes translating the field of view along a line in a first direction of the visual representation of the 3D environment until reaching a point within the visual representation of the 3D environment corresponding to the translational control border 309. For example, as shown in FIG. 4D, a circle 422 on the user interface 302 may define an area in the representation of the 3D environment that corresponds to moving the translational input trigger 306 in the position direct control zone 308.

FIG. 10 illustrates a flowchart of a method for use with the method 500 shown in FIGS. 5 and 9, according to an example implementation. In particular, FIG. 10 shows an example in which the method 500 further includes block 528. Further, FIG. 10 shows an example in which the position circle includes two orthogonally related axes that cross at the translational origin. For example, these axes may correspond to the lateral line 332 and the axial line 336 depicted in FIG. 3B. The two orthogonally related axes correspond to two directions for translating the field of view within the visual representation of the 3D environment (e.g., a lateral direction and an axial direction, as described above with respect to FIG. 3B).

At block 528, the method 500 includes translating the field of view based on a degree to which the translational input trigger moves relative to the two orthogonally related axes between the translational origin and the point on the translational control border 309. Using FIG. 3B as an example, the translational input trigger 306 being on the lateral line 332 at the translational control border 309 (i.e., the circumference of the position direct control zone 308 shown in FIG. 3B), causes the field of view to move laterally, but not axially. Similarly, the translational input trigger 306 being on the axial line 336 at the translational control border 309 (i.e., the circumference of the position direct control zone 308 shown in FIG. 3B), causes the field of view to move axially, but not laterally.

Figure 11:
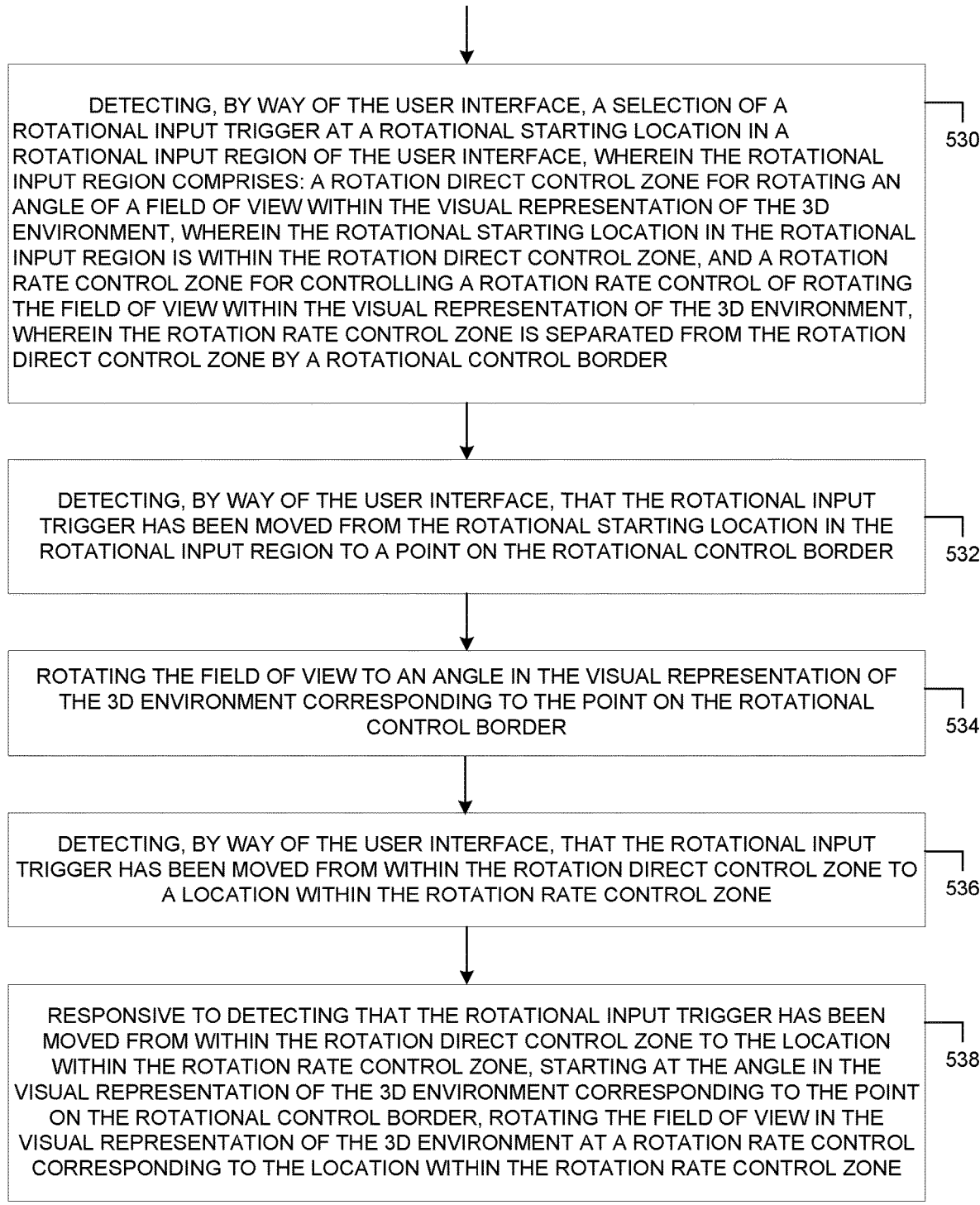
FIG. 11 illustrates a flowchart of a method for use with the method shown in FIG. 5, according to an example implementation.

FIG. 11 illustrates a flowchart of a method for use with the method 500 shown in FIG. 5, according to an example implementation. In particular, FIG. 11 shows an example in which the method 500 further includes blocks 530, 532, 534, 536, and 538. At block 530, the method 500 includes detecting, by way of the user interface 302, a selection of a rotational input trigger 318 at a rotational starting location in a rotational input region 316 of the user interface 302. The rotational input region 316 includes (i) a rotation direct control zone 320 for rotating an angle of a field of view within the visual representation of the 3D environment, wherein the rotational starting location in the rotational input region is within the rotation direct control zone, and (ii) a rotation rate control zone 322 for controlling a rotation rate control of rotating the field of view within the visual representation of the 3D environment, wherein the rotation rate control zone 322 is separated from the rotation direct control zone 320 by a rotational control border 319. For example the rotation direct control zone 320 may be concentrically oriented with the rotation rate control zone 322 forming a ring around the rotation direct control zone 320. A border where the rotation direct control zone 320 meets the rotation rate control zone 322 can be the referred to as the rotational control border 319. A center point 340 of the rotational input trigger 318 crossing the rotational control border 319 may cause a change in a control scheme in effect for navigating the field of view within the representation of the 3D environment.

At block 532, the method 500 includes detecting, by way of the user interface 302, that the rotational input trigger 318 has been moved from the rotational starting location in the rotational input region 316 to a point on the rotational control border 319. For example, the trigger may be selected by a user and dragged from the rotational starting location to the point of the rotational control border 319.

At block 534, the method 500 includes rotating the field of view to an angle in the visual representation of the 3D environment corresponding to the point on the rotational control border 319. Between the rotational starting location (e.g., a center point of the rotation direct control zone 320) and the rotational control border 319, navigating within the representation of the 3D environment may operate in a first mode in which the field of view rotates within a defined range of angles (e.g., plus or minus twenty degrees along one or more axes or rotation) corresponding to edges of the rotation direct control zone 320. This navigation may occur at a rotation rate that corresponds to how quickly the input trigger is moved within the rotation direct control zone 320.

At block 536, the method 500 includes detecting, by way of the user interface 302, that the rotational input trigger 318 has been moved from within the rotation direct control zone 320 to a location within the rotation rate control zone 322. This may involve determining that a center point 340 of the rotational input trigger 318 has crossed the rotational control border 319.

At block 538, the method 500 includes, responsive to detecting that the rotational input trigger 318 has been moved from within the rotation direct control zone 320 to the location within the rotation rate control zone 322, starting at the angle in the visual representation of the 3D environment corresponding to the point on the rotational control border 319, rotating the field of view in the visual representation of the 3D environment at a rotation rate corresponding to the location within the rotation rate control zone. This may involve changing a control scheme of navigating within the representation of the 3D environment from a first control scheme in which the rotation rate control is proportional to a velocity of moving the rotational input trigger 318 to a second control scheme in which the rotation rate control is proportional to a distance of the rotational input trigger 318 from the rotational starting location.

Figure 12:
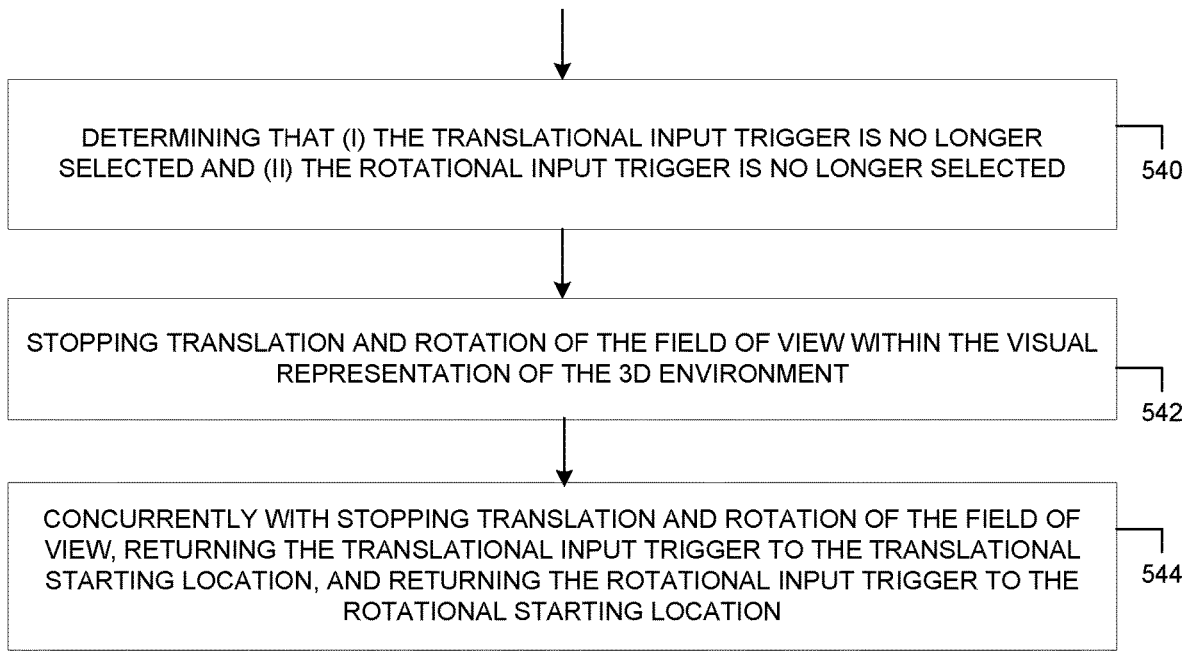
FIG. 12 illustrates a flowchart of a method for use with the method shown in FIGS. 5 and 11, according to an example implementation.

FIG. 12 illustrates a flowchart of a method for use with the method 500 shown in FIGS. 5 and 11, according to an example implementation. In particular, FIG. 12 shows an example in which the method 500 further includes blocks 540, 542, and 534. At block 540, the method 500 includes determining that (i) the translational input trigger 306 is no longer selected and (ii) the rotational input trigger 318 is no longer selected. For example, this may involve determining that a user is no longer touching the user interface 302.

Responsive to determining that (i) the translational input trigger 306 is no longer selected and (ii) the rotational input trigger 318 is no longer selected, the method 500 further includes blocks 542 and 546. At block 542, the method 500 includes stopping translation and rotation of the field of view within the visual representation of the 3D environment. At block 544, the method 500 includes, concurrently with stopping translation and rotation of the field of view, returning the translational input trigger 306 to the translational origin, and returning the rotational input trigger 318 to the rotational starting location. In this manner, when a user stops touching the input triggers, they return to their respective starting locations.

Figure 13:
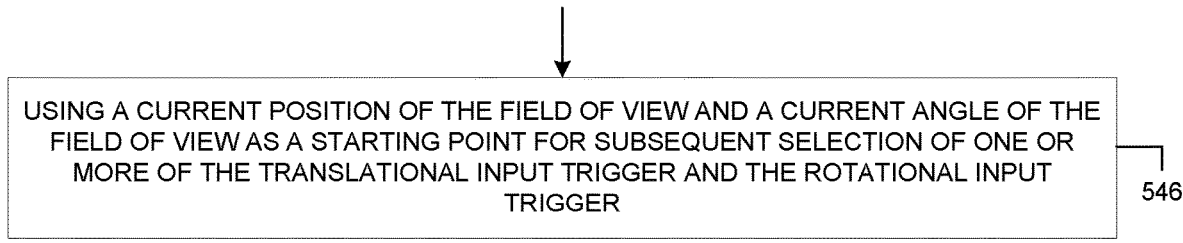
FIG. 13 illustrates a flowchart of a method for use with the method shown in FIGS. 5 and 12, according to an example implementation.

FIG. 13 illustrates a flowchart of a method for use with the method shown in FIGS. 5 and 12, according to an example implementation. In particular, FIG. 13 shows an example in which the method 500 further includes block 546. At block 546, the method 500 includes using a current position of the field of view and a current angle of the field of view as a starting point for subsequent selection of one or more of the translational input trigger 306 and the rotational input trigger 318. In this manner, a user can resume navigating within the representation of the 3D environment after having released the input triggers.

Figure 14:
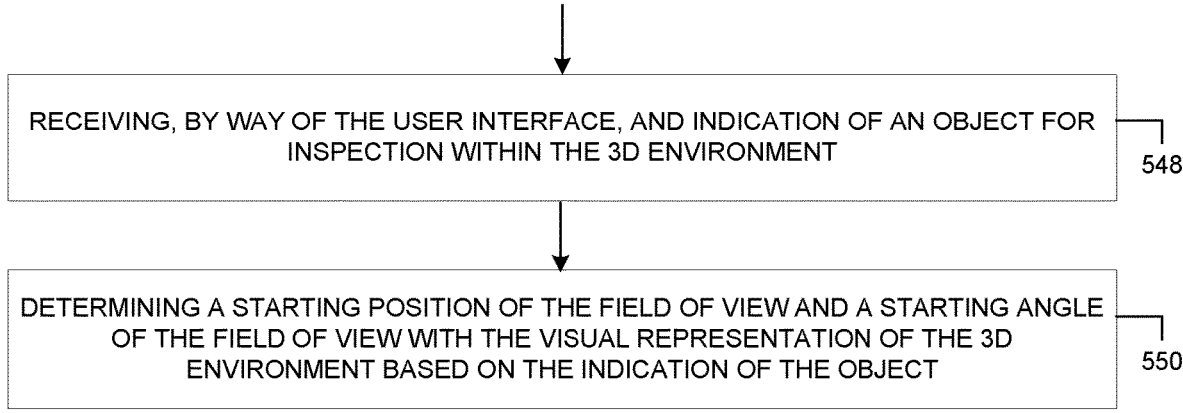
FIG. 14 illustrates a flowchart of a method for use with the method shown in FIG. 5, according to an example implementation.

FIG. 14 illustrates a flowchart of a method for use with the method 500 shown in FIG. 5, according to an example implementation. In particular, FIG. 14 shows an example in which the method 500 further includes blocks 548 and 550. At block 548, the method 500 includes receiving, by way of the user interface 302, and indication of an object for inspection within the 3D environment. For examples, a user may select the object from a set of stored objects. The stored objects may include, for example, a plurality of different aircraft types, or other types of objects. This may result in a retrieving a 3D representation of the object, including, for example schematic information that may allow the user to perform inspection or maintenance operations.

At block 550, the method 500 includes determining a starting position of the field of view and a starting angle of the field of view with the visual representation of the 3D environment based on the indication of the object. For example, the starting position and starting angle may be a default position and angle, or may be a position and angle associated with a particular aspect of the object. For example, if a particular component of the object is scheduled for inspection or maintenance, the position and angle may correspond to that particular component.

Figure 15:
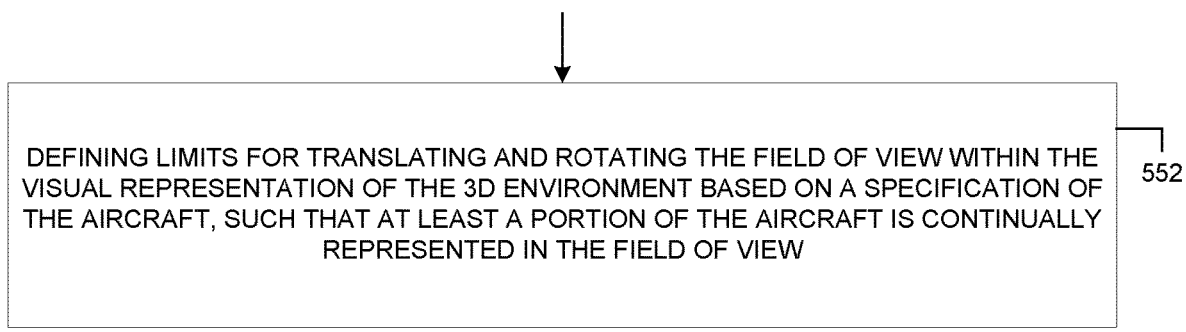
FIG. 15 illustrates a flowchart of a method for use with the method shown in FIGS. 5 and 14, according to an example implementation.

FIG. 15 illustrates a flowchart of a method for use with the method shown in FIGS. 5 and 14, according to an example implementation. In particular, FIG. 15 shows an example in which the method 500 further includes block 552. Block 552 corresponds to an implementation in which the object of block 548 is an aircraft. At block 552, the method 500 includes defining limits for translating and rotating the field of view within the visual representation of the 3D environment based on a specification of the aircraft, such that at least a portion of the aircraft is continually represented in the field of view. In this manner, the method 500 may increase ease of use by limiting an area in which the field of view can navigate.

Figure 16:
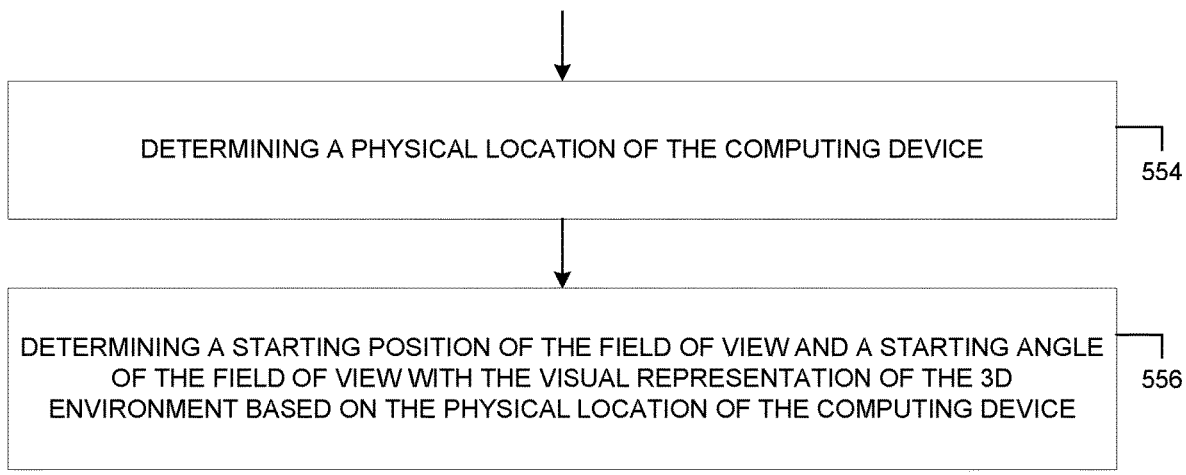
FIG. 16 illustrates a flowchart of a method for use with the method shown in FIG. 5, according to an example implementation.

FIG. 16 illustrates a flowchart of a method for use with the method shown in FIG. 5, according to an example implementation. In particular, FIG. 15 shows an example in which the method 500 further includes blocks 554 and 556. At block 554, the method 500 includes determining a physical location of the computing device 102. This may include determining a global position of the computing device 102 (e.g., by using GPS data) or a relative position of the computing device 102 (e.g., by determining that the computing device 102 is within a threshold distance 206 of an object, such as the aircraft 204). At block 556, the method 500 includes determining a starting position of the field of view and a starting angle of the field of view with the visual representation of the 3D environment based on the physical location of the computing device. For example, a pose (e.g., a position and orientation) of the computing device 102 relative to an object (e.g., the aircraft 204), and the starting position and starting angle represented in the visual representation of the 3D environment may be based on the pose of the computing device 102. In this manner, a user may be able to determine his or her bearings relative to the object that is being inspected or maintained.

Thus, within examples, a robust and easy-to-use system is provided for a user to effectively inspect or maintain an object, such as an aircraft. Providing input triggers situated in control zones that change modes of navigation allows for both small-scale adjustments once a particular component is within a field of view, and for quick navigation to relatively distant components in the field of view. Interaction with a computing device associated with the object further allows for a user to effectively review each component of the object that is scheduled for inspection or maintenance.

Within the examples provided herein, various units are used. The units provided herein in relation to the representation of the 3D environment may correspond to virtual representations of physical units (e.g., an aircraft may be defined in terms of meters, feet, etc.), but other units associated with the representation (e.g., virtual units, such as pixels) can be used.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for navigating within a visual representation of a three-dimensional (3D) environment, the method comprising:
   detecting, by way of a user interface of a computing device, a selection of a translational input trigger at a translational origin in a translational input region of the user interface, wherein the translational input region comprises:
      a position direct control zone for translating a position of a field of view within a visual representation of a 3D environment, wherein the translational origin in the translational input region is within the position direct control zone, and
      a position rate control zone for controlling a velocity of translating the field of view within the visual representation of the 3D environment, wherein the position rate control zone is separated from the position direct control zone by a translational control border;
   detecting, by way of the user interface, that the translational input trigger has been moved from the translational origin in the translational input region to a point on the translational control border;
   translating the field of view to a point in the visual representation of the 3D environment corresponding to the point on the translational control border;
   detecting, by way of the user interface, that the translational input trigger has been moved from within the position direct control zone to a location within the position rate control zone; and
   responsive to detecting that the translational input trigger has been moved from within the position direct control zone to the location within the position rate control zone, starting at the point in the visual representation of the 3D environment corresponding to the point on the translational control border, translating the field of view in the visual representation of the 3D environment at a velocity corresponding to the location within the position rate control zone.

2. The method of claim 1, further comprising:
   detecting, by way of the user interface, that the translational input trigger has remained within a threshold distance of the point within the position rate control zone for more than a threshold time; and
   responsive to detecting that the translational input trigger has remained within the threshold distance of the point within the position rate control zone for more than the threshold time, starting at the velocity corresponding to the location within the position rate control zone, translating the field of view in the visual representation of the 3D environment at an accelerating rate.

3. The method of claim 1, further comprising:
   determining that the translational input trigger is no longer selected;
   responsive to determining that the translational input trigger is no longer selected, stopping translation of the field of view within the visual representation of the 3D environment; and
   concurrently with stopping translation of the field of view, returning the translational input trigger to the translational origin.

4. The method of claim 1, wherein the user interface comprises a touchscreen, wherein the position direct control zone comprises a position circle on the touchscreen, the position circle having a central portion and a circumference, wherein the circumference corresponds to the translational control border, wherein the translational origin is located in the central portion of the position circle, and
   wherein detecting that the translational input trigger has been moved from the translational origin to the point on the translational control border comprises determining that (i) an input has been received at the central portion of the position circle and (ii) input contact has been maintained between the central portion of the position circle and the circumference of the position circle.

5. The method of claim 4, wherein the position circle comprises two orthogonally related axes that cross at the translational origin, wherein the two orthogonally related axes correspond to two directions for translating the field of view within the visual representation of the 3D environment, wherein both of the two orthogonally related axes correspond to a snap distance within which the translational input trigger causes translation of the field of view along a line in a corresponding direction of the visual representation of the 3D environment, the method further comprising:

determining that the translational input trigger is within the snap distance of a first axis of the two orthogonally related axes, wherein translating the field of view to the point in the visual representation of the 3D environment corresponding to the point on the translational control border comprises translating the field of view along a line in a first direction of the visual representation of the 3D environment until reaching a point within the visual representation of the 3D environment corresponding to the translational control border.

6. The method of claim 4, wherein the position circle comprises two orthogonally related axes that cross at the translational origin, wherein the two orthogonally related axes correspond to two directions for translating the field of view within the visual representation of the 3D environment, and wherein translating the field of view to the point in the visual representation of the 3D environment corresponding to the point on the translational control border comprises translating the field of view based on a degree to which the translational input trigger moves relative to the two orthogonally related axes between the translational origin and the point on the translational control border.

7. The method of claim 1, further comprising:
detecting, by way of the user interface, a selection of a rotational input trigger at a rotational starting location in a rotational input region of the user interface, wherein the rotational input region comprises:
  a rotation direct control zone for rotating an angle of a field of view within the visual representation of the 3D environment, wherein the rotational starting location in the rotational input region is within the rotation direct control zone, and
  a rotation rate control zone for controlling a rate of rotating the field of view within the visual representation of the 3D environment, wherein the rotation rate control zone is separated from the rotation direct control zone by a rotational control border;
detecting, by way of the user interface, that the rotational input trigger has been moved from the rotational starting location in the rotational input region to a point on the rotational control border;
rotating the field of view to an angle in the visual representation of the 3D environment corresponding to the point on the rotational control border;
detecting, by way of the user interface, that the rotational input trigger has been moved from within the rotation direct control zone to a location within the rotation rate control zone; and
responsive to detecting that the rotational input trigger has been moved from within the rotation direct control zone to the location within the rotation rate control zone, starting at the angle in the visual representation of the 3D environment corresponding to the point on the rotational control border, rotating the field of view in the visual representation of the 3D environment at a rotation rate corresponding to the location within the rotation rate control zone.

8. The method of claim 7, further comprising:
determining that (i) the translational input trigger is no longer selected and (ii) the rotational input trigger is no longer selected;
responsive to determining that (i) the translational input trigger is no longer selected and (ii) the rotational input trigger is no longer selected,
stopping translation and rotation of the field of view within the visual representation of the 3D environment; and
concurrently with stopping translation and rotation of the field of view, returning the translational input trigger to the translational origin, and returning the rotational input trigger to the rotational starting location.

9. The method of claim 8, further comprising:
using a current position of the field of view and a current angle of the field of view as a starting point for subsequent selection of one or more of the translational input trigger and the rotational input trigger.

10. The method of claim 1, further comprising:
receiving, by way of the user interface, and indication of an object for inspection within the 3D environment; and
determining a starting position of the field of view and a starting angle of the field of view with the visual representation of the 3D environment based on the indication of the object.

11. The method of claim 10, wherein the object is an aircraft, the method further comprising:
defining limits for translating and rotating the field of view within the visual representation of the 3D environment based on a specification of the aircraft, such that at least a portion of the aircraft is continually represented in the field of view.

12. The method of claim 1, further comprising:
determining a physical location of the computing device; and
determining a starting position of the field of view and a starting angle of the field of view with the visual representation of the 3D environment based on the physical location of the computing device.

13. A computing device having a user interface, a processor, and memory storing instructions executable by the processor to:
detect, by way of the user interface, a selection of a translational input trigger at a translational origin in a translational input region of the user interface, wherein the translational input region comprises:
  a position direct control zone for translating a position of a field of view within a visual representation of a 3D environment, wherein the translational origin in the translational input region is within the position direct control zone, and
  a position rate control zone for controlling a velocity of translating the field of view within the visual representation of the 3D environment, wherein the position rate control zone is separated from the position direct control zone by a translational control border;
detect, by way of the user interface, that the translational input trigger has been moved from the translational origin in the translational input region to a point on the translational control border;
translate the field of view to a point in the visual representation of the 3D environment corresponding to the point on the translational control border;
detect, by way of the user interface, that the translational input trigger has been moved from within the position direct control zone to a location within the position rate control zone; and
responsive to detecting that the translational input trigger has been moved from within the position direct control zone to the location within the position rate control zone, starting at the point in the visual representation of the 3D environment corresponding to the point on the translational control border, translate the field of view in the visual representation of the 3D environment at a velocity corresponding to the location within the position rate control zone.

14. The computing device of claim 13, wherein the user interface comprises a touchscreen having a plurality of edges, wherein the translational input region is disposed along a first edge of the plurality of edges, wherein the user interface further comprises a rotational input region disposed along a second edge of the plurality of edges that is parallel to the first edge.

15. The computing device of claim 14, wherein the translational input region is disposed within 220 pixels of the first edge and the rotational input region is disposed within 220 pixels of the second edge.

16. The computing device of claim 15, wherein the instructions are further executable by the processor to:
  detect, by way of the user interface, a selection of a rotational input trigger at a rotational starting location in a rotational input region of the user interface, wherein the rotational input region comprises:
    a rotation direct control zone for rotating an angle of a field of view within the visual representation of the 3D environment, wherein the rotational starting location in the rotational input region is within the rotation direct control zone, and
    a rotation rate control zone for controlling a rate of rotating the field of view within the visual representation of the 3D environment, wherein the rotation rate control zone is separated from the rotation direct control zone by a rotational control border;
  detect, by way of the user interface, that the rotational input trigger has been moved from the rotational starting location in the rotation input region to a point on the rotational control border;
  rotate the field of view to an angle in the visual representation of the 3D environment corresponding to the point on the rotational control border;
  detect, by way of the user interface, that the rotational input trigger has been moved from within the rotation direct control zone to a location within the rotation rate control zone; and
  responsive to detecting that the rotational input trigger has been moved from within the rotation direct control zone to the location within the rotation rate control zone, starting at the angle in the visual representation of the 3D environment corresponding to the point on the rotational control border, rotate the field of view in the visual representation of the 3D environment at a rotation rate corresponding to the location within the rotation rate control zone.

17. A non-transitory computer readable medium having stored thereon instructions, that when executed by one or more processors of a computing device, cause the computing device to perform functions comprising:
  detecting, by way of a user interface of a computing device, a selection of a translational input trigger at a translational origin in a translational input region of the user interface, wherein the translational input region comprises:
    a position direct control zone for translating a position of a field of view within a visual representation of a 3D environment, wherein the translational origin in the translational input region is within the position direct control zone, and
    a position rate control zone for controlling a velocity of translating the field of view within the visual representation of the 3D environment, wherein the position rate control zone is separated from the position direct control zone by a translational control border;
  detecting, by way of the user interface, that the translational input trigger has been moved from the translational origin in the translational input region to a point on the translational control border;
  translating the field of view to a point in the visual representation of the 3D environment corresponding to the point on the translational control border;
  detecting, by way of the user interface, that the translational input trigger has been moved from within the position direct control zone to a location within the position rate control zone; and
  responsive to detecting that the translational input trigger has been moved from within the position direct control zone to the location within the position rate control zone, starting at the point in the visual representation of the 3D environment corresponding to the point on the translational control border, translating the field of view in the visual representation of the 3D environment at a velocity corresponding to the location within the position rate control zone.

18. The non-transitory computer readable medium of claim 17, the functions further comprising:
  detecting, by way of the user interface, that the translational input trigger has remained within a threshold distance of the point within the position rate control zone for more than a threshold time; and
  responsive to detecting that the translational input trigger has remained within the threshold distance of the point within the position rate control zone for more than the threshold time, starting at the velocity corresponding to the location within the position rate control zone, translating the field of view in the visual representation of the 3D environment at an accelerating rate.

19. The non-transitory computer readable medium of claim 17, the functions further comprising:
  detecting, by way of the user interface, a selection of a rotational input trigger at a rotational starting location in a rotational input region of the user interface, wherein the rotational input region comprises:
    a rotation direct control zone for rotating an angle of a field of view within the visual representation of the 3D environment, wherein the rotational starting location in the rotational input region is within the rotation direct control zone, and
    a rotation rate control zone for controlling a rotation rate control of rotating the field of view within the visual representation of the 3D environment, wherein the rotation rate control zone is separated from the rotation direct control zone by a rotational control border;
  detecting, by way of the user interface, that the rotational input trigger has been moved from the rotational starting location in the rotation input region to a point on the rotational control border;
  rotating the field of view to an angle in the visual representation of the 3D environment corresponding to the point on the rotational control border;
  detecting, by way of the user interface, that the rotational input trigger has been moved from within the rotation direct control zone to a location within the rotation rate control zone;

responsive to detecting that the rotational input trigger has been moved from within the rotation direct control zone to the location within the rotation rate control zone, starting at the angle in the visual representation of the 3D environment corresponding to the point on the rotational control border, rotating the field of view in the visual representation of the 3D environment at a rotation rate corresponding to the location within the rotation rate control zone;

determining that (i) the translational input trigger is no longer selected and (ii) the rotational input trigger is no longer selected;

responsive to determining that (i) the translational input trigger is no longer selected and (ii) the rotational input trigger is no longer selected,
- stopping translation and rotation of the field of view within the visual representation of the 3D environment; and
- concurrently with stopping translation and rotation of the field of view, returning the translational input trigger to the translational origin, and returning the rotational input trigger to the rotational starting location.

20. The non-transitory computer readable medium of claim 19, the functions further comprising:

determining a physical location of the computing device; and determining a starting position of the field of view and a starting angle of the field of view with the visual representation of the 3D environment based on the physical location of the computing device.

* * * * *